(12) United States Patent
Noro

(10) Patent No.: US 6,867,750 B2
(45) Date of Patent: Mar. 15, 2005

(54) THREE DIMENSIONAL DISPLAY CONTROL APPARATUS AND METHOD, AND STORAGE MEDIUM

(75) Inventor: Hideo Noro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 452 days.

(21) Appl. No.: 09/952,347

(22) Filed: Sep. 12, 2001

(65) Prior Publication Data

US 2002/0093465 A1 Jul. 18, 2002

(30) Foreign Application Priority Data

Sep. 12, 2000 (JP) ....................................... 2000-276727

(51) Int. Cl.$^7$ ............................................... G09G 5/00
(52) U.S. Cl. ........................ 345/6; 345/419; 345/427; 348/42; 348/47; 348/48; 348/52
(58) Field of Search ........................ 348/42, 51, 43–50, 348/52–60; 345/427, 419, 6

(56) References Cited

U.S. PATENT DOCUMENTS

| | | | | |
|---|---|---|---|---|
| 4,896,210 A | * | 1/1990 | Brokenshire et al. | ......... 348/51 |
| 5,065,236 A | * | 11/1991 | Diner | ........................... 348/54 |
| 5,175,616 A | * | 12/1992 | Milgram et al. | ............... 348/47 |
| 5,510,832 A | * | 4/1996 | Garcia | ........................... 348/56 |
| 5,745,126 A | * | 4/1998 | Jain et al. | ..................... 382/154 |
| 6,677,939 B2 | * | 1/2004 | Uchiyama | .................... 345/419 |
| 6,760,020 B1 | * | 7/2004 | Uchiyama et al. | ........... 345/419 |
| 2001/0033327 A1 | * | 10/2001 | Uomori et al. | ................ 348/47 |
| 2003/0179198 A1 | * | 9/2003 | Uchiyama | ..................... 345/427 |

FOREIGN PATENT DOCUMENTS

JP 2000020757 A * 1/2000 ........... G06T/17/40

* cited by examiner

*Primary Examiner*—Henry N. Tran
*Assistant Examiner*—Peter Prizio
(74) *Attorney, Agent, or Firm*—Cowan, Liebowitz & Latman, P.C.

(57) ABSTRACT

The value of a stereo vision parameter for an immediately preceding frame is subtracted from the value of the stereo vision parameter for a current frame to obtain a differential value d. If d<−δ (lower limit value), the differential value d is set to −δ, and if d>δ (upper limit value), the differential value d is set to δ. If the differential value d is within the range of −δ to δ, it is left as it is without being changed. The thus set differential value d is added to the value of the stereo vision parameter for the immediately preceding frame, and the resulting value is set as the stereo vision parameter for the current frame. By thus setting the stereo vision parameter, a limit is imposed upon abrupt change of the stereo vision parameter for the current frame.

31 Claims, 18 Drawing Sheets

JUMP TO FIG.2C   JUMP TO FIG.2B

LEFT IMAGE

RIGHT IMAGE

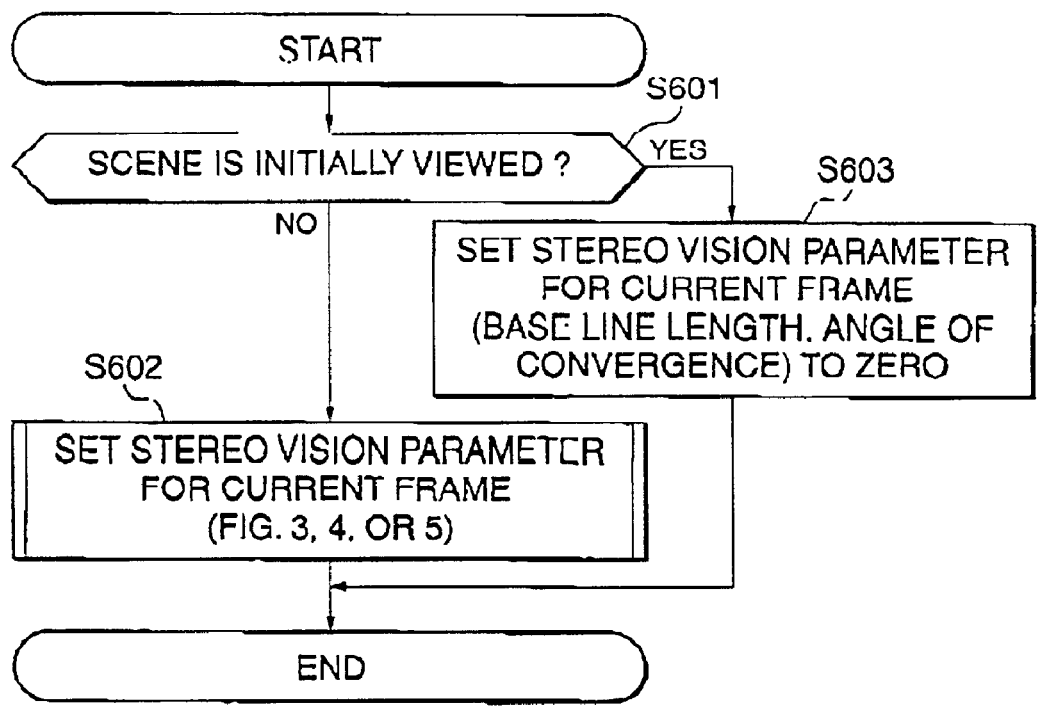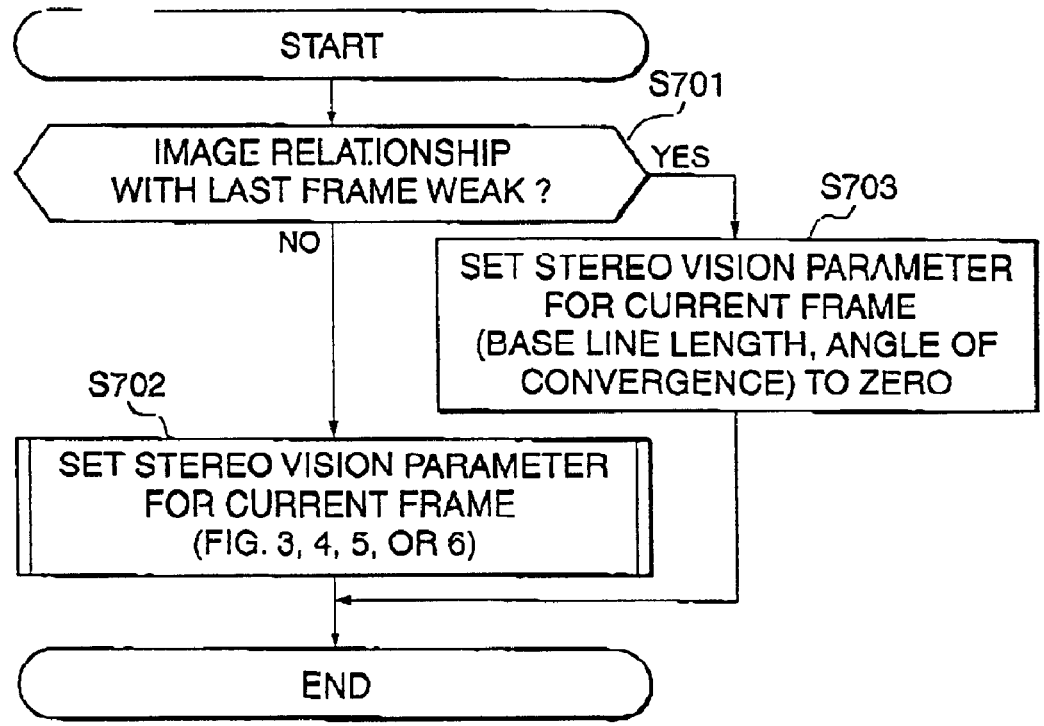

VALUE IN FLAT PORTION IS SET AS VALUE OF STEREO VISION PARAMETER FOR CURRENT FRAME

THREE DIMENSIONAL DISPLAY CONTROL APPARATUS AND METHOD, AND STORAGE MEDIUM

BACKGROUND OF THE INVENTION

1. Field of the Invention

The present invention related to a three dimensional display control apparatus which controls stereo vision parameters in order to display a subject upon a stereo three dimensional display.

2. Description of Related Art

Conventionally, a stereo three dimensional display apparatus which displays a subject upon a stereo three dimensional display has been known, and generally, in a three dimensional display control apparatus which performs output control for such a display device, software such as VRML (Virtual Reality Modeling Language) is employed for performing three dimensional display of CG data.

In the case of performing stereo display, when the same point of a subject in three dimensional space is being displayed by the three dimensional display control apparatus, its positions upon the image for the right eye and upon the image for the left eye are usually different. The user or observer apprehends the distance to the above-mentioned point by merging in his brain these two images whose positions are different (refer to FIGS. 2A to 2C).

There are various stereo vision parameters such as base line length and angle of convergence. When one or more of these parameters are changed, the positions upon the display screen for the left eye and for the right eye vary, even though the point is the same. When this occurs, as a result, the observer comes to feel that the distance to the above-mentioned point has altered. For example, increase of the base line length corresponds to increase in the stature of the observer such that he/she feels as if he/she were a giant, while decrease of the base line length corresponds to decrease in his stature such that he/she feels as if he/she were a dwarf. In such a case, since of course the subject under observation is a body whose size cannot change, the observer feels that the body has become closer or further away with respect to himself, since his actual size cannot change although his subjective size changes.

Although the most suitable value of a stereo vision parameter varies according to the scene in question, this is because the observer can no longer merge the left and right images when the stereo vision of the left and right images is unduly emphasized. In order for the observer to experience the stereo vision of the left and right images without any feeling of uneasiness, it is necessary for all the bodies in the viewing volume (which is the range which can be seen from his eyes) or a portion to which he is directing most attention, to be at a distance equal or greater from the observer to or than a certain predetermined distance (hereinafter referred to as the limit stereographic viewing distance); the stereo vision impression of the left and right images becomes stronger, the closer to the observer are the bodies, or the portions thereof to which the observer is principally directing his attention. The limit stereographic viewing distance is determined by physical characteristics of the display device and by the personal tastes of the observer.

In other words, in the case of a stationary scene, for the observer to perform stereographic viewing of left and right images most effectively without any feeling of uneasiness, it is desirable for the body closest to the observer in his viewing volume, or the portion thereof to which he is principally directing his attention, to be positioned at a spot which is distant from the observer by just the limit stereographic viewing distance. In this manner, the most suitable value of the stereo vision parameter is determined by taking as a standard that one among the bodies present in the viewing volume which is closest to the observer's eyes, or that one which is considered to be the subject of attention. The most suitable value of the stereo vision parameter will be hereinafter referred to as "the most suitable stereo vision parameter value".

Among conventional three dimensional display control apparatuss, such devices which perform stereo vision parameter control by automatic control, the most suitable stereo vision parameter value is calculated for each frame, and the body scene is displayed in stereo by successively setting the stereo vision parameter for the current frame to the above-mentioned most suitable suitable stereo vision parameter value.

However, with the above described conventional type three dimensional display control apparatuss, since the stereo vision parameter for the current frame is set instantaneously or immediately to the most suitable stereo vision parameter value, if a body should abruptly intrude into the viewing volume, or should leave the viewing volume, it may happen that the most suitable stereo vision parameter value changes abruptly.

When the stereo vision parameter changes, it is also necessary for the observer to adapt himself/herself for stereo vision. In particular, if large changes occur which are abrupt or discontinuous over time, the observer needs to take very great trouble to perform the instantaneous adaptation which is required. And if this is repeated, he/she can experience considerable pain. Furthermore, depending upon circumstances, it may happen that stereo vision becomes impossible, because it is not possible to keep up with abrupt changes of the stereo vision parameter.

SUMMARY OF THE INVENTION

With the foregoing in view, it is an object to provide a three dimensional display control apparatus and method, which can alleviate the burden upon the observer by preventing sudden changes of the stereo vision parameter, thus easily providing a continuous stereographic viewing, and a storage medium storing a program for implementing the method.

To attain the above object, the present invention provides a three dimensional display control apparatus that controls a stereo vision parameter for displaying a subject in stereo, comprising most suitable parameter value calculation means for calculating a most suitable value of the stereo vision parameter related to the subject, and shifting meals operable upon execution of control of the stereo vision parameter so as to obtain a visual effect of change of a distance of a user to the subject, for progressively varying the stereo vision parameter so as to shift the stereo vision parameter to the most suitable value for the stereo vision parameter calculated by the most suitable parameter value calculation means.

In a preferred embodiment, the shifting means performs control of the stereo vision parameter so as to obtain a visual effect that the subject is approaching towards the user.

Preferably, the shifting means operable upon execution of control of the stereo vision parameter so as to obtain a visual effect that the subject is receding from the user, for changing the stereo vision parameter by progressively shifting the stereo vision parameter to the most suitable value of the stereo vision parameter.

Also preferably, the shifting means uses different manners of progressively shifting during execution of control of the stereo vision parameter so as to obtain the visual effect that the subject is approaching towards the user and during execution of control of the stereo vision parameter so as to obtain the visual effect that the subject is receding from the user.

More preferaly, the shifting means progressively shifts the stereo vision parameter at a rate of change with respect to time greater during execution of control of the stereo vision parameter so as to obtain the visual effect that the subject is receding from the user, than during execution of control of the stereo vision parameter so as to obtain the visual effect that the subject is approaching toward the user.

Still more preferably, the shifting means progressively shifts the stereo vision parameter by providing a limit to the rate of change with respect to time.

Preferably, the shifting means temporarily sets the stereo vision parameter to a first predetermined value in an initial state of control of the stereo vision parameter.

More preferably, the shifting means temporarily sets the stereo vision parameter to a second predetermined value if a relationship between two images before and after a change of scene is weak.

Preferably, the three dimensional display control apparatus according to the present invention further comprises initial delay means for delaying commencement of control of the stereo vision parameter by the shifting means by a predetermined time period.

In a preferred embodiment, he shifting means is operable in response to command from a user, for performing control of the stereo vision parameter so as to directly shift the stereo vision parameter to the most suitable value of the stereo vision parameter calculated by the most suitable parameter value calculation means, without performing control of the stereo vision parameter so as to progressively change the stereo vision parameter, control of the stereo vision parameter so as to temporarily set the stereo vision parameter to the first predetermined value, and control of the stereo vision parameter so as to temporarily set the stereo vision parameter to the second predetermined value.

Preferably, if the most suitable value of the stereo vision parameter calculated by the most suitable parameter value calculating means shows a periodic change and there is a portion in a period of the most suitable value of the stereo vision parameter in which the most suitable stereo vision parameter does not change, the shifting means performs control of the stereo vision parameter so as to directly shift the stereo vision parameter to a value of the portion in the period of the most suitable value of the stereo vision parameter, without performing control of the stereo vision parameter so as to progressively change the stereo vision parameter, control of the stereo vision parameter so as to temporarily set the stereo vision parameter to the first predetermined value, and control of the stereo vision parameter so as to temporarily set the stereo vision parameter to the second predetermined value.

Advantageously, the three dimensional display control apparatus according to the present invention further comprises most suitable parameter value fixing means for fixing the most suitable value of the stereo vision parameter calculated by the most suitable parameter value calculating means, and fixation canceling means for canceling the fixation of the most suitable value of the stereo vision parameter by the most suitable parameter value fixing means when the stereo vision parameter agrees with the most suitable value of the stereo vision parameter fixed by the most suitable parameter value fixing means.

Preferably, the most suitable parameter value fixing means fixes the most suitable value of the stereo vision parameter in timing designated by a user.

Also preferably, if the most suitable value of the stereo vision parameter calculated by the most suitable parameter value calculating means shows a periodic change and there is a portion in a period of the most suitable value of the stereo vision parameter in which the most suitable stereo vision control of the stereo vision parameter does not change, the most suitable parameter value fixing means fixes the most suitable value of the stereo vision parameter to a value of the portion in the period of the calculated most suitable value of the stereo vision parameter.

More preferably, the three dimensional display control apparatus accoring to the present invention further comprises agreement displaying means operable when the stereo vision parameter agrees with the most suitable value of the stereo vision parameter calculated by the most suitable parameter value calculating means, for displaying an indication of the agreement.

Also preferably, the three dimensional display control apparatus according to the present invention further comprises non-agreement display means operable when the stereo vision parameter does not agree with the most suitable value of the stereo vision parameter calculated by the most suitable parameter value calculating means, for displaying an indication of the non-agreement.

More preferably, the three dimensional display control apparatus according to the present invention further comprises separation display means for displaying a degree by which the stereo vision parameter and the most suitable value of the stereo vision parameter calculated by the most suitable parameter value calculating means differ from one another, for a time period until the stereo vision parameter and the most suitable value of the stereo vision parameter calculated by the most suitable parameter value calculating means agree with one another.

To attain the above object, the present invention also provides a three dimensional display control method of controlling a stereo vision parameter for displaying a subject in stereo, comprising a most suitable parameter value calculation step of calculating a most suitable value of the stereo vision parameter related to the subject, and a shifting step of progressively varying the stereo vision parameter so as to shift the stereo vision parameter to the most suitable value for the stereo vision parameter calculated in the most suitable parameter value calculation step, upon execution of control of the stereo vision parameter so as to obtain a visual effect of change of a distance of a user to the subject.

To attain the above object, the present invention further provides a storage medium storing a program for use in a three dimensional display control method of controlling a stereo vision parameter for displaying a subject in stereo, the program comprising a program code for executing a most suitable parameter value calculation step of calculating a most suitable value of the stereo vision parameter related to the subject, and a shifting step of progressively varying the stereo vision parameter so as to shift the stereo vision parameter to the most suitable value for the stereo vision parameter calculated in the most suitable parameter value calculation step, upon execution of control of the stereo vision parameter so as to obtain a visual effect of change of a distance of a user to the subject.

The above and other objects, features and advantages of the present invention will become apparent from the following description taken in conjunction with the accompanying drawings.

BRIEF DESCRIPTION OF THE DRAWINGS

FIG. 6 is a flow chart showing a stereo vision parameter setting process according to a fourth embodiment of the present invention;

FIG. 7 is a flow chart showing a stereo vision parameter setting process according to a fifth embodiment of the present invention;

DETAILED DESCRIPTION OF THE EMBODIMENTS

The present invention will now be described with reference to the drawings showing preferred embodiments thereof.

First Embodiment

Figure 1:
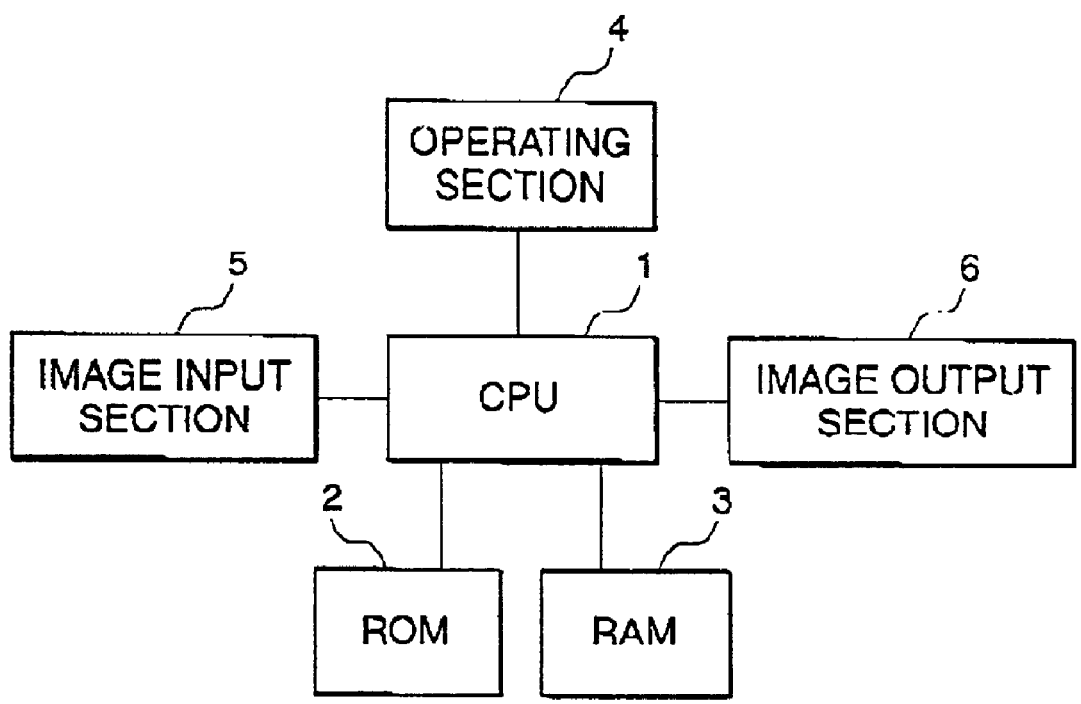
FIG. 1 is a block diagram showing the overall structure of a three dimensional display control apparatus according to a first embodiment of the present invention.

FIG. 1 is a block diagram showing the overall structure of a three dimensional display control apparatus according to a first embodiment of the present invention.

This three dimensional display control apparatus is comprised of a CPU 1 (most suitable parameter value calculating means, shifting means, initial delay means, most suitable parameter value fixing means, and fixation canceling means), to which are connected a ROM 2, a RAM 3, an operating section 4 (most suitable parameter value fixing means, matching display means, non-matching display means, and separation display means), an image input section 5, and an image output section 6. The CPU 1 performs overall control of the entire device. Various programs which are executed by the CPU 1 are stored in the ROM 2.

The RAM 3 temporarily stores the values of various flags and data items, and also functions as a work area when the CPU 1 is executing the programs.

The operating section 4 is comprised of a user interface and a display section, not shown, and is used for the user to input various commands to the device and for displaying various items of information to the user.

The image input section 5 inputs an imaging signal from an imaging device, not shown. The image output section 6 outputs images of various three-dimensional bodies to a stereo three dimensional display apparatus, not shown.

Software for performing stereo three dimensional display of CG data such as VRML (Virtual Reality Modeling Language) may be used by this three dimensional display control apparatus.

Figure 2A:
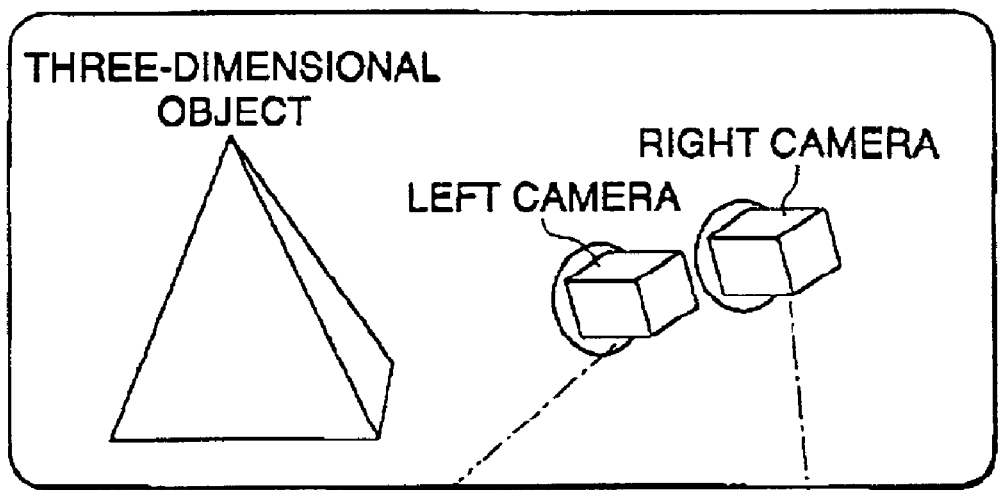
FIGS. 2A to 2C are views showing the relationship between a three dimensional object and left and right images thereof.
Figure 2C:
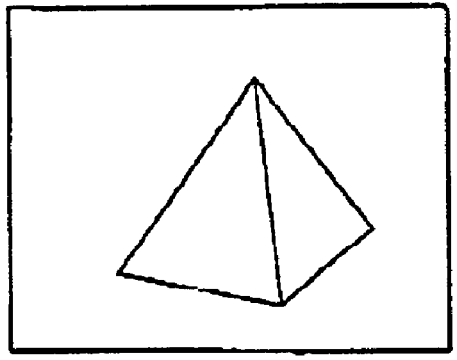
Figure 2B:
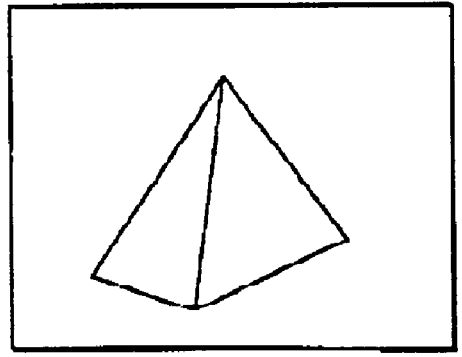

FIGS. 2A to 2C are views showing the relationship between a three dimensional object and left and right images thereof.

FIG. 2A shows a situation when an image which is to be displayed in stereo is being shot by left and right cameras, so as to display the subject in three dimensional space upon a three dimensional display control apparatus, while FIGS. 2B and 2C show that the positions of the same part in images which are formed for the left eye and the right eye are usually different.

The observer apprehends the distance to the above-mentioned point by merging in his brain these two images whose positions are different.

There are various stereo vision parameters such as base line length and angle of convergence. When one or more of these parameters are changed, the positions upon the display screen for the left eye and for the right eye vary, even though the point is the same. When this occurs, as a result, the observer comes to feel that the distance to the above-mentioned point has altered.

For example, increase of the base line length corresponds to increase in the stature of the observer such that he/she feels as if he/she were a giant, while decrease of the base line length corresponds to decrease in his stature such that he/she feels as if he/she were a dwarf.

In such a case, since of course the subject under observation is a body whose size cannot change, the observer feels that the body has become closer or further away with respect to himself, since his actual size cannot change although his subjective size changes.

In the case of a stationary scene, for the observer to perform stereographic viewing of left and right images most effectively without any feeling of uneasiness, it is desirable for the body closest to the observer in his viewing volume, or the portion thereof to which he is principally directing his attention, to be positioned at a spot which is distant from the observer by just a certain distance (limit stereographic viewing distance). The limit stereographic viewing distance is determined by physical characteristics of the display device and by the personal tastes of the observer.

In this manner, the most suitable value of the stereo vision parameter is determined by taking as a standard that one among the bodies present in the viewing volume which is closest to the visual point, or that one which is considered to be the subject of attention. The most suitable value of the stereo vision parameter will be hereinafter referred to as "the most suitable stereo vision parameter value".

In the conventional three dimensional display control apparatus, the most suitable stereo vision parameter value is calculated for each frame, and the body scene is displayed in stereo by successively setting the stereo vision parameter for the current frame to the above-mentioned most suitable suitable stereo vision parameter value.

In the first embodiment, however, the stereo vision parameter for the current frame is not set instantaneously in a uniform manner, but rather is controlled so as not to undergo large discontinuous changes over time. The method by which this stereo vision parameter is controlled will now be explained.

Figure 3:
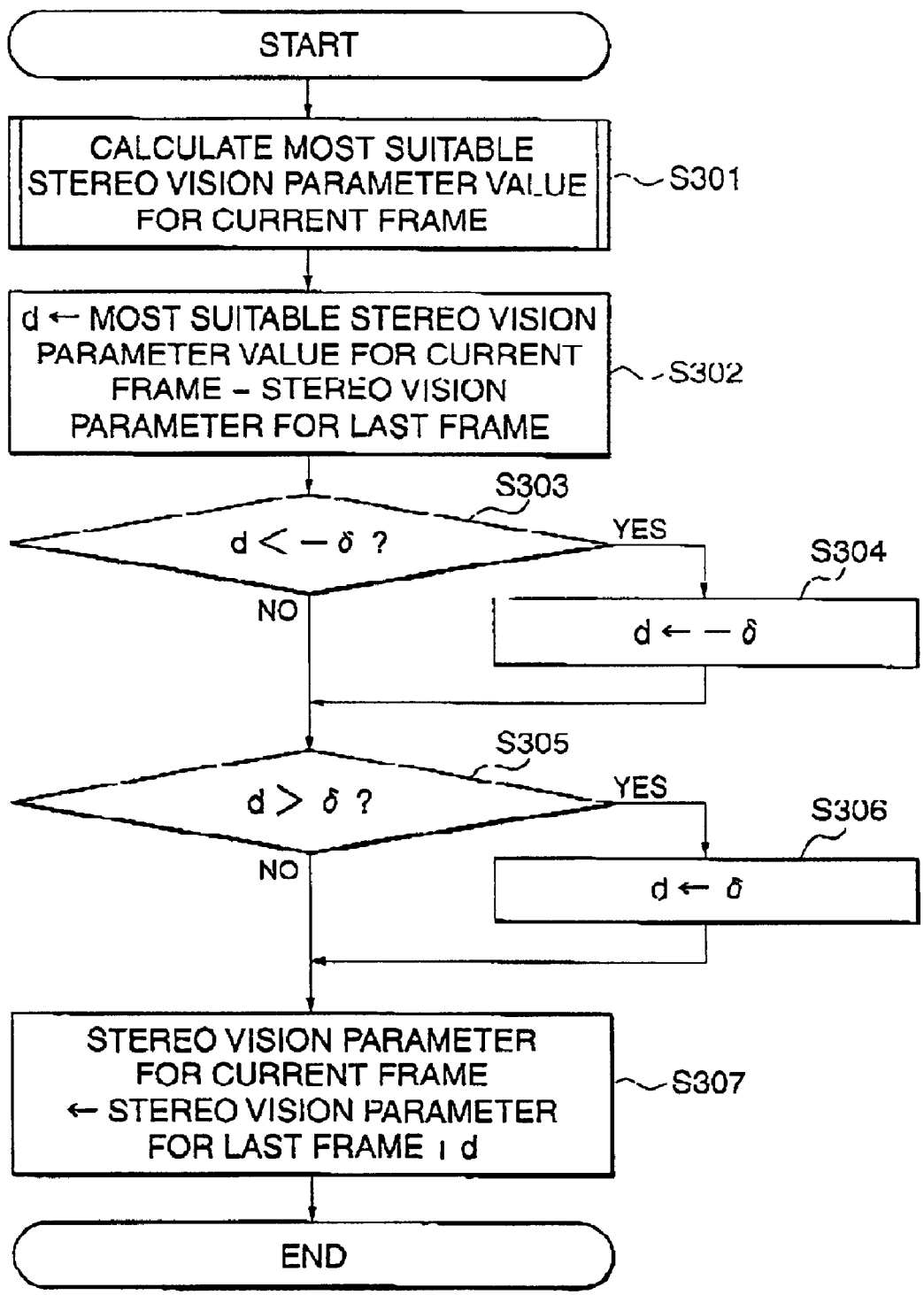
FIG. 3 is a flow chart showing a stereo vision parameter setting process according to the first embodiment.

FIG. 3 is a flow chart showing a stereo vision parameter setting process according to the first embodiment.

First, in a step S301, the most suitable stereo vision parameter value for the current frame is calculated based on CG data or the like. Next, in a step S302, a value of the stereo vision parameter for the immediately preceding or last frame is subtracted from the most suitable stereo vision parameter value for the current frame which has just been obtained by the above-mentioned calculation, to obtain the differential value d. Then, in a step S303, it is determined whether or not the value of this difference d is less than a value $-\delta$. Here, the value $\delta$ is a limit value. If the display time interval between the immediately preceding frame and the current frame is represented by $\Delta t$ and the allowable value of change of the stereo vision parameter in unit time is represented by D, then $\delta = D \times \Delta t$. The allowable value D is a positive constant value which is determined according to the personal tastes of the observer.

If the result of the determination in the step S303 is that $d<-\delta$, then in a step S304 the differential value d is set to $-\delta$, and the process proceeds to a step S305; while on the other hand, if $d<-\delta$ does not hold, then the process jumps to this step S305.

In this step S305, a determination is made as to whether or not $d>\delta$, and if the result of this determination is that $d>\delta$, then in a step S306 the differential value d is set to $\delta$, and the process proceeds to a step S307; while on the other hand, if $d>\delta$ does not hold, then the process jumps to this step S307.

In the step S307, the differential value d is added to the value of the stereo vision parameter for the immediately preceding frame and the result is set as the value of the stereo vision parameter for the current frame, and then this process is terminated.

In other words, if the difference value which has been calculated falls within the range $-\delta$ to $+\delta$, then this differential value d is left as it is without alteration; but on the other hand, if this difference value is outside the range $-\delta$ to $+\delta$, then it is set to $-\delta$ or to $+\delta$. Thus, the differential value d is limit-processed with $+\delta$ and $-\delta$, so that $+\delta$ and $-\delta$ become its upper limit value and its lower limit value. By doing this, it is possible to provide a limit upon abrupt changes of the stereo vision parameter for the current frame.

It should be noted that if the actual stereo vision parameter being used is the base line length, then the processing in the above steps S303 and S304 is a limit process for performing control so as to limit the value of the speed at which a body whose position relative to the observer's eyes in the viewing volume does not change appears to recede from the observer.

On the other hand, if the actual stereo vision parameter being used is the base line length, the processing in the above steps S305 and S306 is a limit process for performing control so as to limit the value of the speed at which a body whose position relative to the observer's eyes in the viewing volume does not change appears to approach towards the observer.

According to the present embodiment, even if the differential value d between the calculated value for the most suitable stereo vision parameter value for the current frame and the value of the stereo vision parameter for the immediately preceding frame is relatively great, since the value which is set for this stereo vision parameter for the current frame is limited to fall within a predetermined range about its value for the immediately preceding frame, it is possible to ensure that the stereo vision parameter does not chance abruptly, but rather changes progressively or slowly. Accordingly, large discontinuous changes over time do not occur, and the trouble imposed upon the observer is alleviated, no feeling of pain is generated, and impairment or failure of stereo vision is avoided. As a result, it is possible to avoid sudden changes of the stereo vision parameter, thus lightening the burden upon the observer, and it is possible to perform stereographic viewing of objects easily and continuously.

Second Embodiment

A three dimensional display control apparatus according to a second embodiment of the present invention has the same structure as that of the first embodiment (shown in FIG. 1), but is different from the same in the manner of control of the stereo vision parameter.

Figure 4:
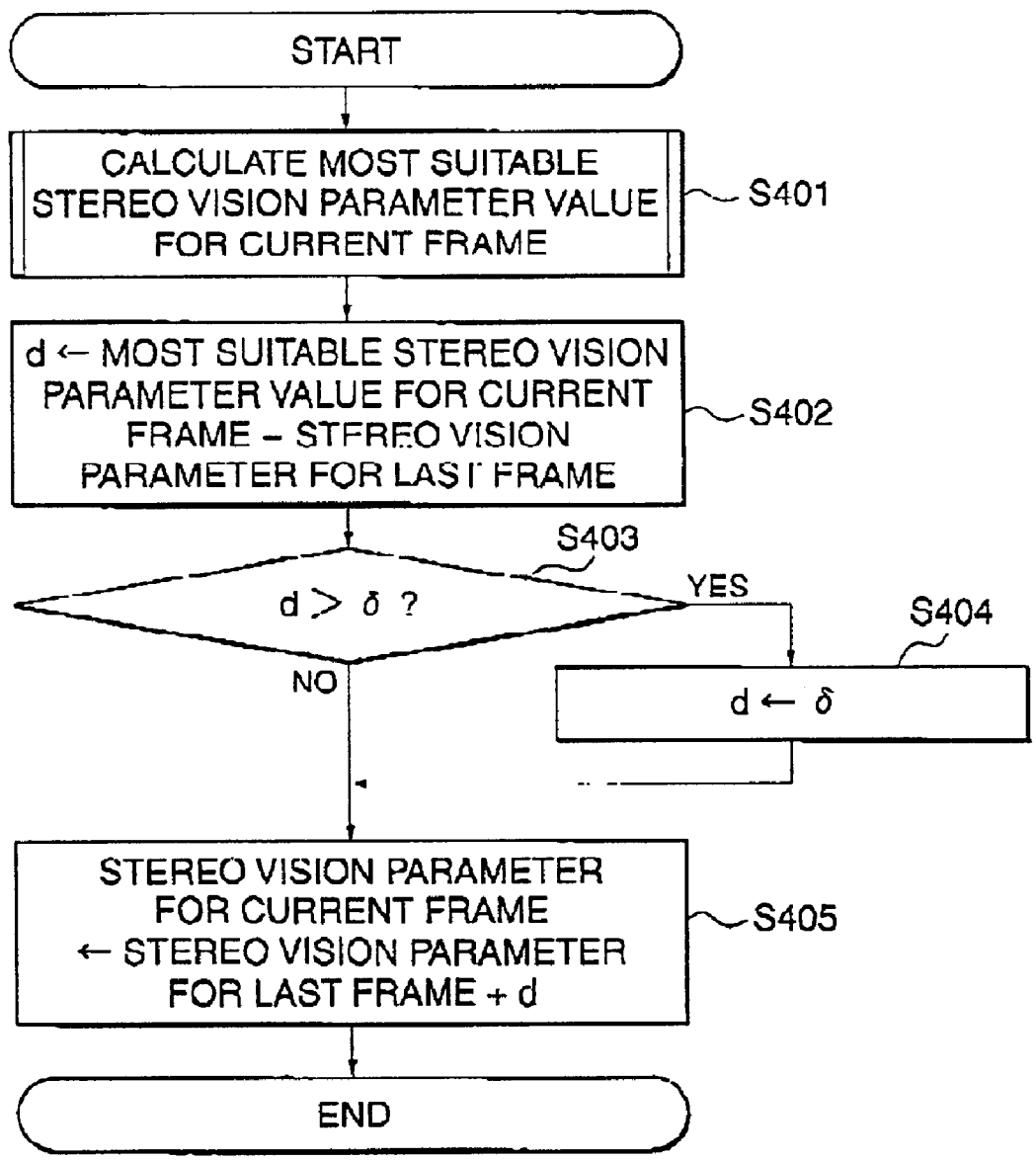
FIG. 4 is a flow chart showing a stereo vision parameter setting process according to the second embodiment of the present invention.

FIG. 4 is a flow chart showing a stereo vision parameter setting process according to the second embodiment. This process corresponds to the process for the first embodiment shown in FIG. 3, except that the steps S303 and S304 of the FIG. 3 process have been eliminated.

First, in steps S401 and S402, the same processes are executed as in the steps S301 and S302 for the first embodiment, and the differential value d is obtained. Next, in steps S403, S404, and S405, the same processes are executed as in the steps S305, S306, and S307 for the first embodiment, and then this process in terminated.

Although for an observer who wishes to look at a body tracking is difficult when the body is coming up close, by contrast, tracking is comparatively easy when the body is retreating far away.

Therefore, according to the present embodiment, on the one hand, with control performed so as to make a body whose position in the viewing volume relative to the observer's eyes does not change appear to come close to the observer, the set value of the stereo vision parameter for the current frame is restrained to within a fixed range about the value for the immediately preceding frame, so that abrupt change of the stereo vision parameter is prevented; while, on the other hand, with control performed so as to make a body whose position in the viewing volume relative to the observer's eyes does not change appear to retreat from the observer, no limitation is imposed and the stereo vision parameter is instantaneously or immediately set to its the most suitable value for each current frame, so that it is possible to ensure quick convergence.

According to the present embodiment, while ensuring quick convergence when the subject is retreating far away, abrupt change of the stereo vision parameter when the subject is coming up close is prevented. As a result, the burden upon the observer is lightened, and stereographic viewing of objects can be easily be performed continuously as a whole.

Third Embodiment

A three dimensional display control apparatus according to a third embodiment of the present invention has the same structure as that of the first embodiment (shown in FIG. 1), but is different from the same in the manner of control of the stereo vision parameter.

Figure 5:
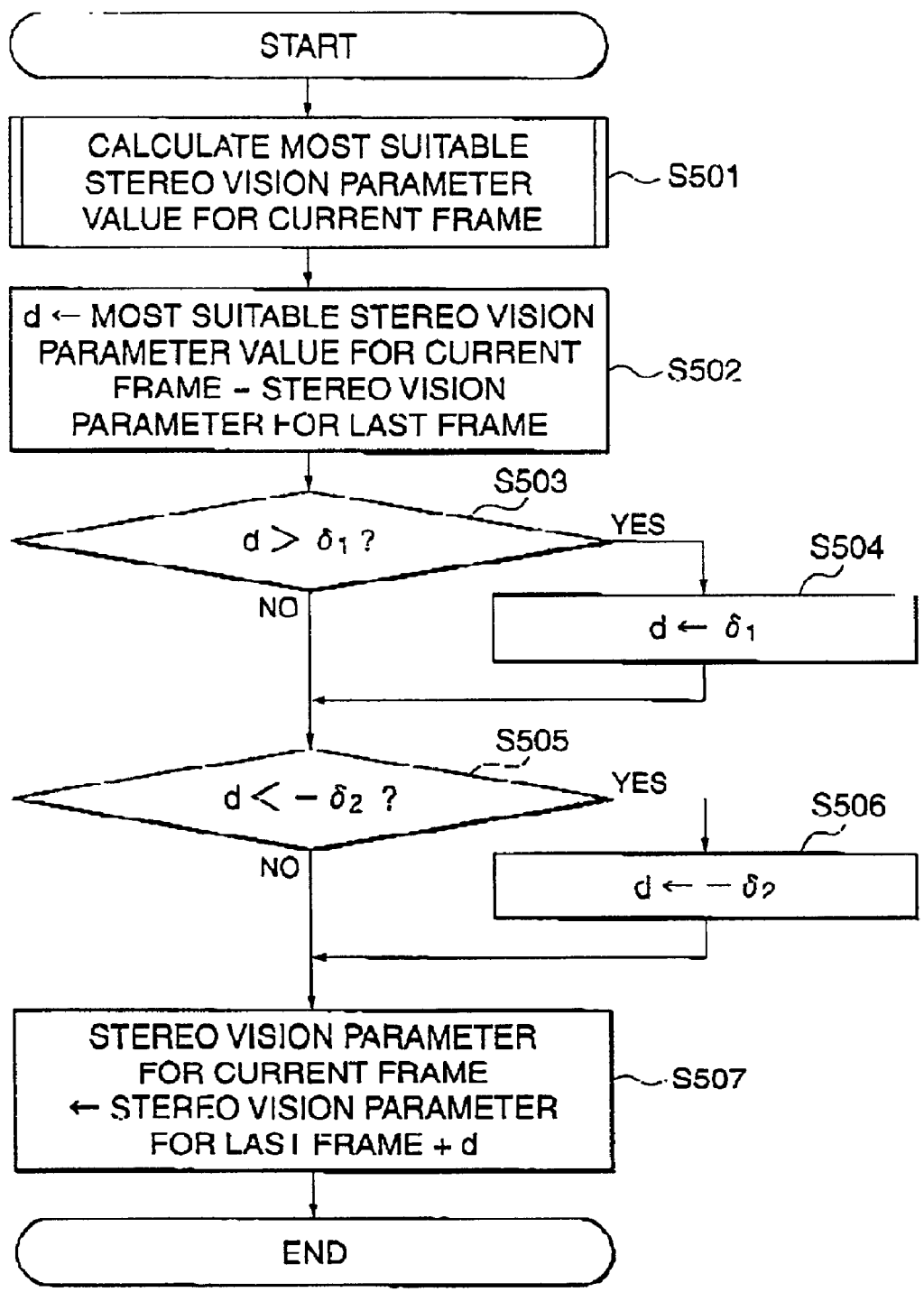
FIG. 5 is a flow chart showing a stereo vision parameter setting process according to a third embodiment of the present invention.

FIG. 5 is a flow chart showing a stereo vision parameter setting process according to the third embodiment. In this process, the control of the stereo vision parameter performed so as to make it appear that the subject is coming nearer and the control of the stereo vision parameter performed so as to make it appear that the subject is retreating farther away are different from one another in the manner or degree of progressively varying the stereo vision parameter.

First, in steps S501 and S502, the same processes are executed as in the steps S301 and S302 for the first embodiment, and the differential value d is obtained. Next, in a step S503, a determination is made as to whether or not the value of the differential value d is greater than a first threshold value $\delta 1$. Here, the threshold value $\delta 1$ is expressed as $\delta_1 = D_1 \times \Delta t$.

If the result of the determination in the step S503 is that $d > \delta_1$, then in a step S504 the differential value d is set to $\delta_1$ and the process proceeds to a step S505, while if on the other hand it is determined that $d > \delta_1$ does not hold, then the process jumps to the step S505.

In the step S505, a determination is made as to whether or not the differential value d is less than a second threshold value $-\delta_2$. Here, the second threshold value $\delta_2$ is expressed as $\delta_2 = D_2 \times \Delta t$. Furthermore, these allowable values D1 and D2 are positive constant values, and are determined according to the personal tastes of the observer such that $\delta_1$ is set to be smaller than $\Delta_2$. If the result of the determination in the step S505 is that $d < \delta_2$, then in a step S506 the differential value d is set to $-\delta_2$, and the process proceeds to a step S507, while if on the other hand it is determined that $d < -\delta_2$ does not hold, then the process jumps to the step S507.

In the step S507, the differential value d is added to the value of the stereo vision parameter for the immediately preceding frame and the result is set as the stereo vision parameter value for the current frame, and then this process is terminated.

According to the third embodiment, in consideration of the fact that for an observer who wishes to view a body, tracking is comparatively easy when the body is retreating away as compared to the case where it is coming up closer, the limit values for the stereo vision parameter for the current frame are set so that the limit value applied to the case where the body is retreating away is set to a greater value than the limit value applied to the case where it is coming up closer. By thus setting the limit values, in the case in which control of the stereo vision parameter is performed so as to make it appear that the subject is retreating farther away, the rate of change of the stereo vision parameter, i.e. change with respect to time is greater, as compared with the case in which control of the stereo vision parameter is performed parameter performed so as to make it appear that the subject is coming nearer. As a result, while ensuring quick convergence when the subject is retreating far away, abrupt change of the stereo vision parameter when the subject is coming up close is prevented. As a result, the burden upon the observer is lightened, and stereographic viewing of objects can be easily be performed continuously.

Fourth Embodiment

A three dimensional display control apparatus according to a fourth embodiment of the present invention has the same structure as that of the first embodiment (shown in FIG. 1), but is different from the same in the manner of control of the stereo vision parameter.

When the observer starts to view a scene which is displayed in stereo, first he adjusts his eyeballs so as to be able to view initially in stereo, but this operation is accompanied with much mental difficulty. Therefore, in the present embodiment, when the observer starts to view the scene, the stereo vision parameter is set to a reasonably demanding value.

FIG. 6 is a flow chart showing a stereo vision parameter setting process according to the fourth embodiment.

First, in a step S601, a determination is made as to whether or not the scene is being initially viewed, i.e. viewed for the first time, and if the result of this determination is that the scene is being initially viewed, then in a step S603 the value of the stereo vision parameter is set so that the left eye and the right eye see the same image. This is implemented by setting parameters for the two cameras which correspond to the left eye and to the right eye to the same value. More specifically, for example, the base line length and the angle of convergence, as the stereo vision parameters, for the current frame are both set to a value of 0 (first predetermined value). Then, this process is terminated.

On the other hand, if the result of this determination in the step S601 is that the scene is not being initially viewed, then in a step S602 a setting process for the stereo vision parameter for the current frame is executed, and then this process is terminated. For this setting process in the step S602, any one of the processes for setting the stereo vision parameter for the current frame according to the first, the second, or the third embodiment of the present invention described above and shown in FIGS. 3, 4, and 5 may be employed.

According to the fourth embodiment, it is possible to start stereographic viewing quickly from the start of viewing the scene by temporarily setting the initial state of the stereo vision parameter (the base line length and/or the angle of convergence) to zero at the start of control of the stereo vision parameter.

Fifth Embodiment

A three dimensional display control apparatus according to a fifth embodiment of the present invention has the same structure as that of the first embodiment (shown in FIG. 1), but is different from the same in the manner of control of the stereo vision parameter.

Depending upon the contents of the scene which the observer is viewing, a shift may occur to an image which has almost no relationship with the scene which has been viewed up till the present. For example, a door is opened and the viewpoint may shift into a different room, or the viewpoint may peek through a microscope. In such a case, if the stereo vision parameter is progressively changed to the most suitable value, therefor, it is likely that the observer will experience a very unnatural feeling. Thus, with this fifth embodiment, it is arranged that in this type of case, temporarily, the stereo vision parameter is set to a value which is not unreasonable.

FIG. 7 is a flow chart showing a stereo vision parameter setting process according to the fifth embodiment.

First, in a step S701, the current image is compared with the scene viewed directly before, and a determination is made as to whether or not the correlation between them is weak. A threshold value related to the degree of relationship is used for making this determination. If the result of this determination is that the scene viewed directly before only has a weak relationship with the current scene, then in a step S703, just as in the case of the step S603 of the FIG. 6 flow chart, the base line length and the angle of convergence as the stereo vision parameters for the current scene are both set to a value of 0 (second predetermined value). Then, this process is terminated.

On the other hand, if the result of this determination in the step S701 is that the scene viewed directly before does not only have a weak relationship with the current scene, then in a step S702 a setting process for the stereo vision parameter for the current frame is executed, and then this process is terminated. For this setting process in the step S702, any one of the processes for setting the stereo vision parameter for the current frame according to the first, the second, third, or fourth embodiment of the present invention described above and shown in FIG. 3, 4, 5 or 6 may be employed.

According to the fifth embodiment, it is possible to start stereographic viewing quickly when the scene shifts to a new scene.

Sixth Embodiment

A three dimensional display control apparatus according to a sixth embodiment of the present invention has the same basic structure as that of the first embodiment (shown in FIG. 1), but further comprises a timer means, not shown in FIG. 1. Furthermore, it is different in the manner of control of the stereo vision parameter from that used in the first embodiment.

When a body suddenly intrudes into the viewing volume, or suddenly exits therefrom, or when a body rotates around another body in a horizontal plane, if the process for bringing the stereo vision parameter towards the most suitable value starts immediately, the stereo vision parameter can enter an unstable state, and the observer may experience an unpleasant feeling. Therefore, with this sixth embodiment, it is arranged to provide a constant time period Td (a predetermined time period) before starting to perform control for actually changing the stereo vision parameter, from the time point at which the disagreement between the actual value of the stereo vision parameter and the most suitable value of the stereo vision parameter is detected.

Figure 8:
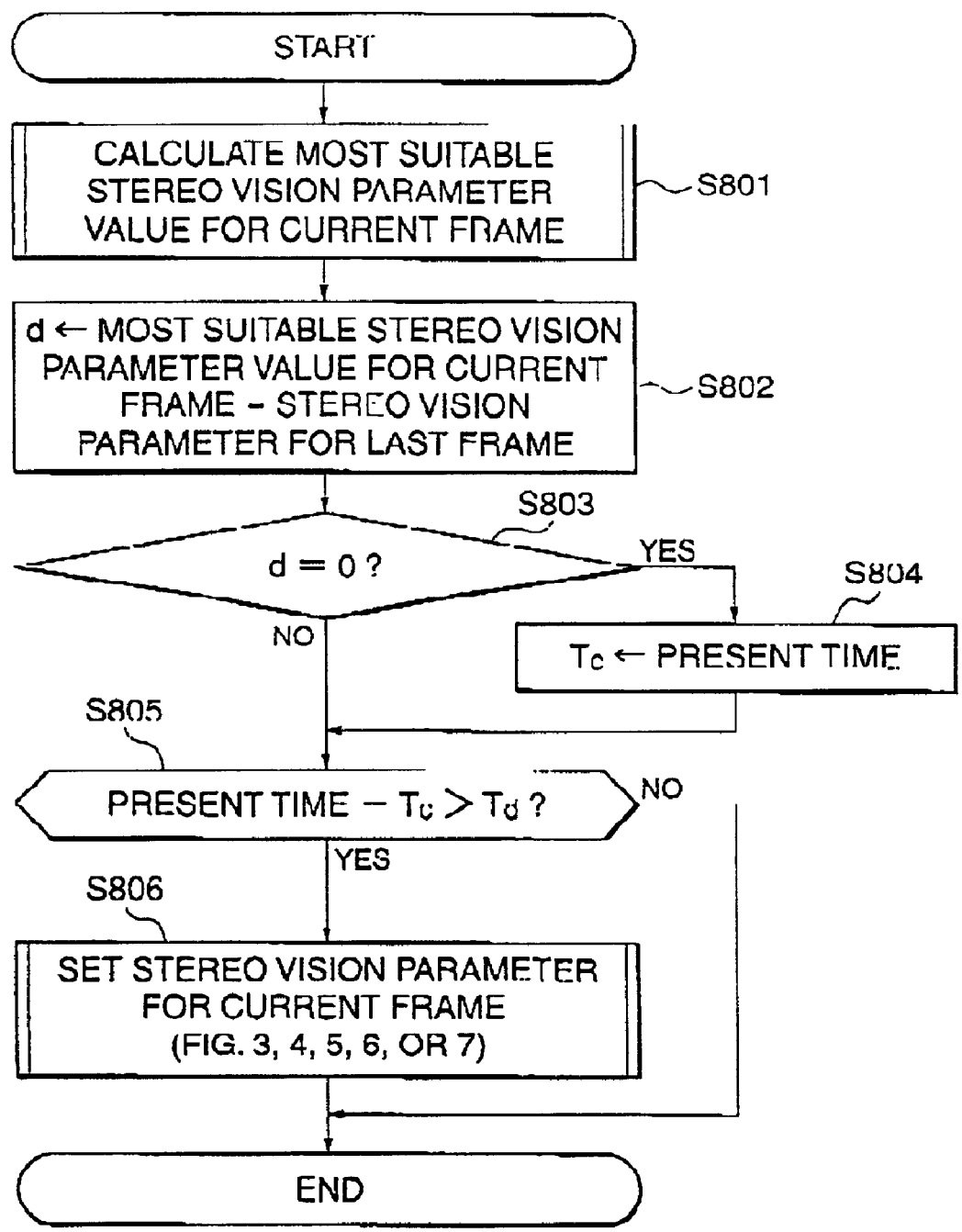
FIG. 8 is a flow chart showing a stereo vision parameter setting process according to a sixth embodiment of the present invention.

FIG. 8 is a flow chart showing a stereo vision parameter setting process according to the sixth embodiment.

First, in steps S801 and S802, the same processes are executed as in the steps S301 and S302 for the first embodiment shown in FIG. 3, and the differential value d is obtained.

Next, in a step S803, a determination is made as to whether or not the differential value d is equal to zero. If the result of this determination is that the differential value d=0, then in a step S804 the present time is set into a timer TC, and then the process proceeds to a step S805; while on the other hand, if the differential value d is not equal to zero, then the process proceeds directly to the step S805, since it has been detected that the most suitable stereo vision parameter value for the current frame and the actual value of the stereo vision parameter for the current frame are not in agreement.

In the steep S805, a determination is made as to whether or not the value of (the current time—the value in the timer $T_c$) is greater than a value $T_d$. If the result of this determination is that (the current time the value in the timer $T_c$) is not greater than $T_d$, then this process is terminated immediately without starting any setting process for the stereo vision parameter for the current frame; while, on the other hand, if (the current time—the value in the timer $T_c$) is greater than $T_d$, then, since the constant time interval $T_d$ has elapsed, in a step S806 a setting process for the stereo vision parameter for the current frame is performed, and then this process is terminated.

For this setting process in the step S806, any one of the processes for setting the stereo vision parameter for the current frame according to the first, the second, third, fourth, or fifth embodiment of the present invention described above and shown in FIG. 3, 4, 5, 6, or 7 may be employed.

According to the sixth embodiment, by providing the delay time period before starting control of the stereo vision parameter, it is possible to avoid inconveniences such as the stereo vision parameter becoming unstable, if the body which has intruded passes out of the viewing volume within this constant time period, or if half of the rotational period of the body which is rotating around the other body elapses within this constant time period.

As a result, increase of instability of the stereo vision parameter due to temporary entry of another body into the viewing volume or the like is prevented, and it becomes possible to perform continuous stereographic viewing easily and stably.

Seventh Embodiment

A three dimensional display control apparatus according to a seventh embodiment of the present invention has the same basic structure as that of the first embodiment (shown in FIG. 1), but further comprises a command display button, not shown in FIG. 1. Furthermore, it is different in the manner of control of the stereo vision parameter from that used in the first embodiment.

Even in a case such as when a body is rotating around another body in a horizontal plane within a solid body being viewed, it the stereo vision parameter varies due to some other cause such as the solid body being viewed being itself shifted in CG space, with control performed so as to make the stereo vision parameter be progressively varied, the stereo vision parameter may go into an unstable state, and may not converge to a stable state.

Therefore, with this seventh embodiment, the stereo vision parameter for the current frame is controlled, according to the will of the observer, so as to immediately and forcibly agree with the most suitable value of this stereo vision parameter for the current frame.

A command button for performing this control is provided within the operating section 4 which is the user interface section. The present invention is not limited to the use of such a command button; it would also be possible to provide a short cut key or the like in the operating section 4 for performing the control.

Figure 9:
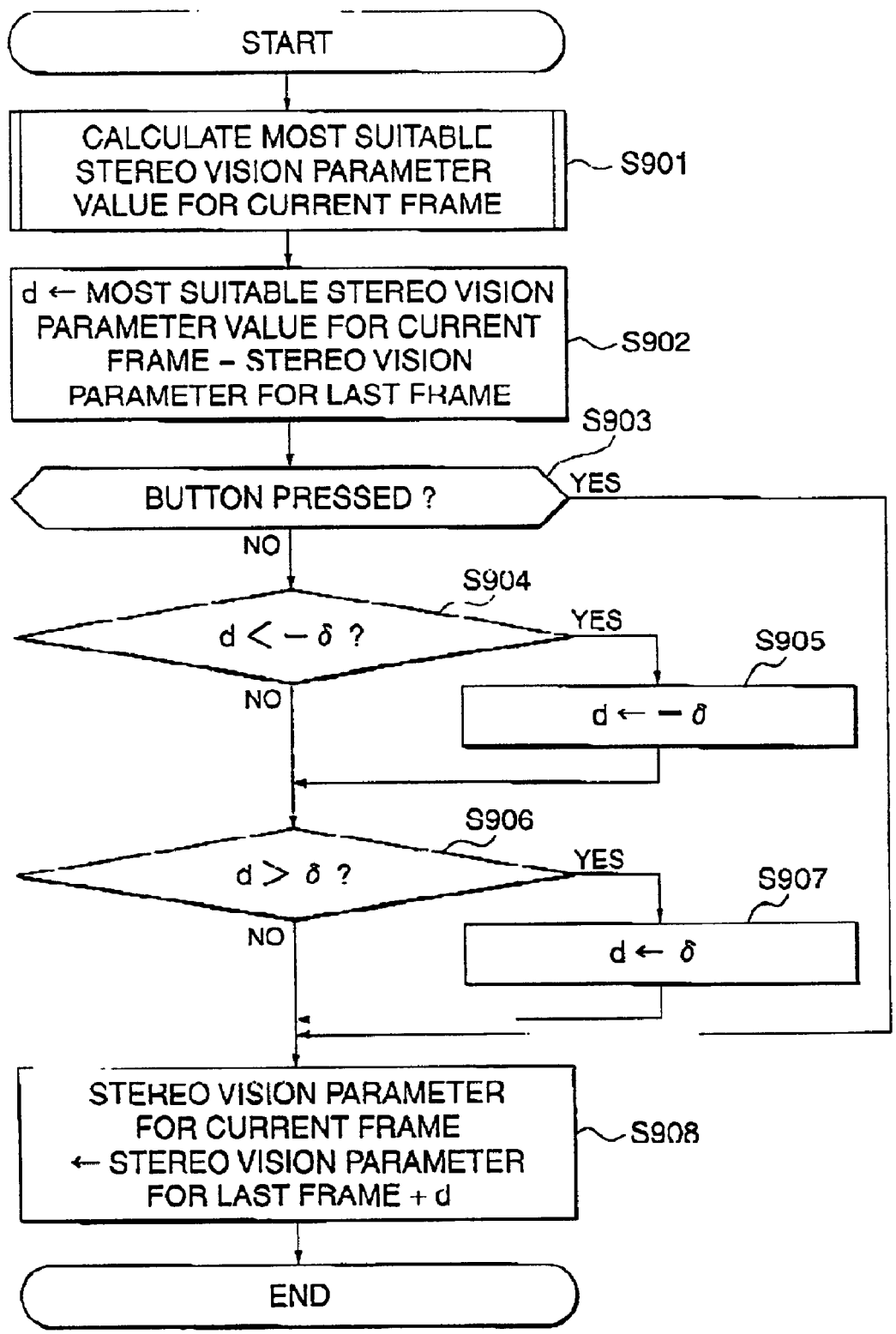
FIG. 9 is a flow chart showing a stereo vision parameter setting process according to a seventh embodiment of the present invention.

FIG. 9 is a flow chart showing a stereo vision parameter setting process according to the seventh embodiment.

First, in steps S901 and S902, the same processes are executed as in the steps S301 and S302 for the first embodiment shown in FIG. 3, and the differential value d is obtained.

Next, in a step S903, a determination is made as to whether or not the command button is pressed. If the result of this determination is that the command button is pressed, the process jums to a step S908 wherein the differential value d is added to the stereo vision parameter for the immediately preceding frame and the resulting value is set as the value for the stereo vision parameter for the current frame.

On the other hand, if it is determined that the command button is pressed, then in steps S904 through S907 the same limit process is performed as in the steps S303 through S306 described above with respect to the first embodiment shown in FIG. 3, and then the process proceeds to the step S908.

The observer can thus cause the system to shift from an unstable state to a stable state by pressing the command button at the moment that the most suitable stereo vision parameter value has stabilized.

According to the seventh embodiment, in the case that, for example, the solid body which is being viewed is itself shifted in CG space, it is possible to ensure quick convergence to a stable state and maintain continuous stereographic viewing by inhibiting the stereo vision parameter from progressively varying by the command of the user, and causing the stereo vision parameter to be forcibly and immediately shifted to the most suitable value therefor.

Moreover, although, in the present embodiment, the forcible agreement by the use of the command button is applied to the first embodiment (whose flow chart was shown in FIG. 3), this measure may be applied to any one of the second, third, fourth, or fifth and subsequent embodiments as well, in the same manner.

In such a case, for example, in the second embodiment, the process of the step S903 may be inserted between the steps S402 and S403 in FIG. 4, and if the determination in the step S903 is YES, then the process jumps to the step S405.

Furthermore, in the third embodiment, the process of the step S903 may be inserted between the steps S502 and S503 in FIG. 5, and if the determination in the step S903 is YES, then the process jumps to the step S507.

Yet further, in the fourth or the fifth embodiment, the process of the step S903 may be inserted in a corresponding position in that one of the processes of FIGS. 3 through 6 which is applied in the process of the step S602 in FIG. 6 or the process of the step S702 in FIG. 7.

Eighth Embodiment

A three dimensional display control apparatus according to an eighth embodiment of the present invention has the same structure as that of the first embodiment (shown in FIG. 1), but is different from the same in the manner of control of the stereo vision parameter.

In a case such as when a body is moving around another body move in a horizontal plane within a solid body being viewed, if the stereo vision parameter varies due to some other cause such as the solid body being viewed being itself shifted in CG space, the most suitable values of the stereo vision parameter assumed over a fixed time interval in the past are observed, and the stereo vision parameter is set based upon the result obtained.

Figure 10:
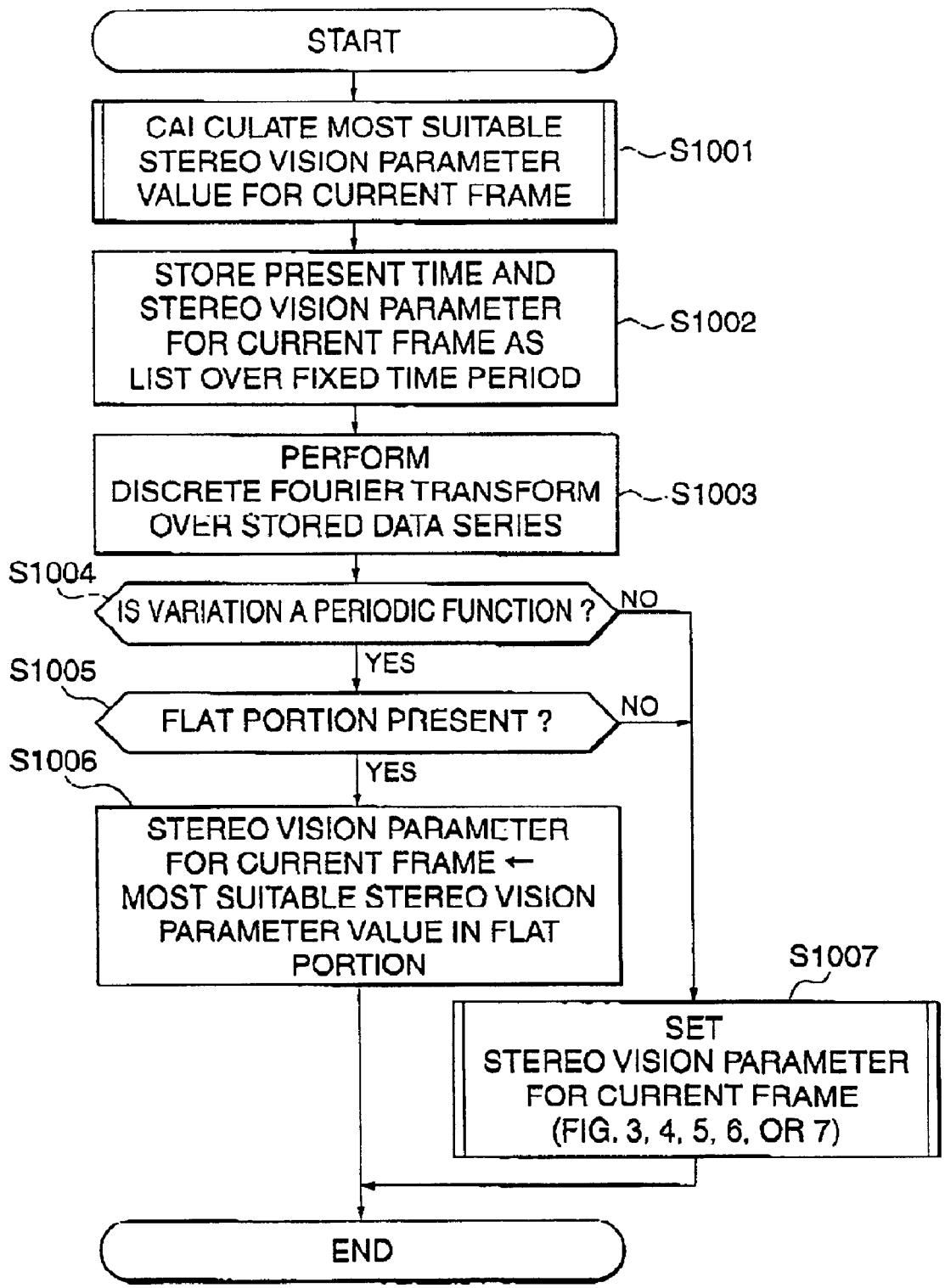
FIG. 10 is a flow chart showing a stereo vision parameter setting process according to an eighth seventh embodiment of the present invention.

FIG. 10 is a flow chart showing a stereo vision parameter setting process according to the eighth embodiment.

First, in a step S1001 the most suitable value of the stereo vision parameter for the current frame is calculated based upon the CG data or the like. Next, in a step S1002, the present time and the stereo vision parameter for the current frame are stored in the form of a list for a predetermined time period. Next, in a step S1003, a discrete Fourier transform is performed upon the stored data. Here, the discrete Fourier transform is performed upon a series of the most suitable stereo vision parameter values and their times of generation which have been observed over a predetermined time period in the past.

Next, in a step S1004, a determination is made as to whether or not the result of this discrete Fourier transform is that the variation of the most suitable stereo vision parameter value is a periodic function, and if the result of this determination is that the most suitable stereo vision parameter value does vary as a periodic function, then in a step S1005 a determination is made as to whether or not within the period of this periodic function there is present a flat portion in which the most suitable stereo vision parameter value does not change.

Figure 11:
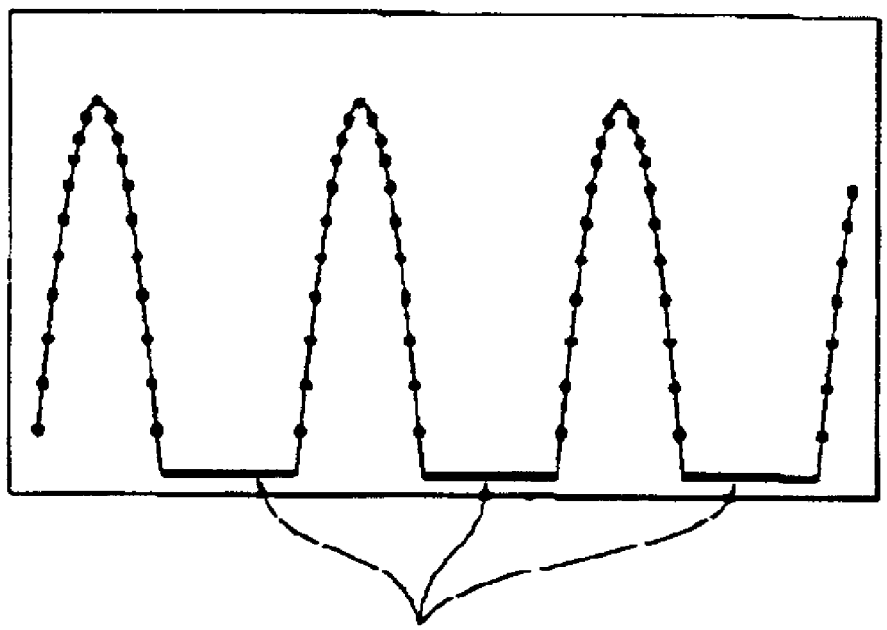
FIG. 11 is a view showing an example of change of a most suitable stereo vision parameter value.

FIG. 11 is a graph showing an example of change of the most suitable stereo vision parameter value which has been observed. For example, in the figure, the most suitable stereo vision parameter value varies as a periodic function, and contains flat portions. If the variation of the most suitable stereo vision parameter value is a periodic function and moreover this periodic function contains flat portions within its period in which the most suitable stereo vision parameter value does not vary, then the process proceeds from the step S1005 to a step S1006.

On the other hand, if the result of the determination in the step S1004 is that the most suitable stereo vision parameter value does not vary as a periodic function, or if it varies as a periodic function but the result of the determination in the step S1005 is that within the period of this periodic function there is not present any flat portion in which it does not vary, then the process jumps to a step S1007.

In the step S1006, the stereo vision parameter for the current frame is set to the value of this periodic function in its flat portion in which the most suitable stereo vision parameter value does not vary in the present or the next period, and then this process is terminated. By thus controlling the stereo vision parameter, in a case such as when the solid body being viewed itself shifts in CG space, it is possible to ensure automatic convergence to a stable state without utilizing any user interface.

On the other hand, in the step S1007, a setting process for the stereo vision parameter for the current frame is performed, and then this process is terminated. For this setting process in the step S1007, any one of the processes for setting the stereo vision parameter for the current frame according to the first, the second, third, fourth, or fifth embodiment of the present invention described above and shown in FIG. 3, 4, 5, 6, or 7 may be employed.

According to the eighth embodiment, in a case such as when a body is rotating around another body in a horizontal plane within a solid body being viewed, it is possible to maintain stereographic viewing continuously by ensuring automatic convergence to a stable state, even when the stereo vision parameter is changing due to some other cause, such as the solid body being viewed being shifted itself in CG space.

Ninth Embodiment

A three dimensional display control apparatus according to a ninth embodiment of the present invention has the same basic structure as that of the first embodiment (shown in FIG. 1), but further comprises a fixation button, not shown in FIG. 1. Furthermore, it is different from the same in the manner of control of the stereo vision parameter.

In a case such as when a body is rotating around another body in a horizontal plane within a solid body being viewed, when the stereo vision parameter is changing due to some other cause, such as the solid body being viewed being shifted itself in CG space, with the process of the seventh embodiment described above and shown in FIG. 9, the stereo vision parameter changes instantaneously, which is undesirable. Due to this, the observer cannot continue stereographic viewing unless he/she instantaneously copes with such change of the stereo vision parameter.

This operation is accompanied by pain to the observer, and depending upon the circumstances it may happen that stereographic viewing cannot be performed for some while. Therefore, with the ninth embodiment of the present invention, instead of causing instantaneous change of the stereo vision parameter, the stereo vision parameter is temporarily fixed in timing which is designated by the observer.

It should be noted that, although the fixation button is provided within the operating section 4 which is the user interface section, the present invention is not limited to the use of a fixation button; it is possible to provide a short cut key or the like in the operating section 4 for performing the control.

Figure 12:
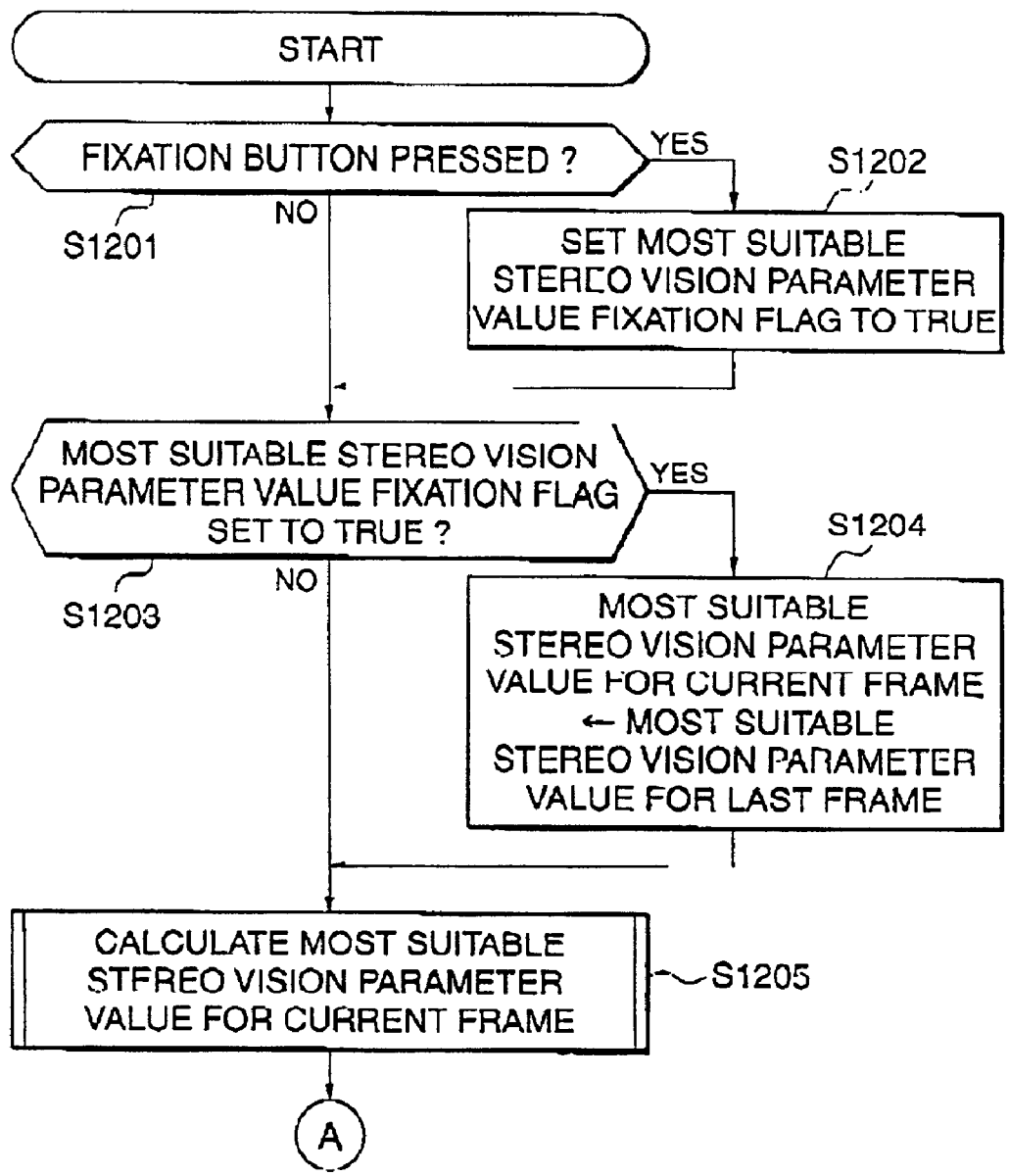
FIG. 12 is a flow chart showing a stereo vision parameter setting process according to a ninth embodiment of the present invention.
Figure 13:
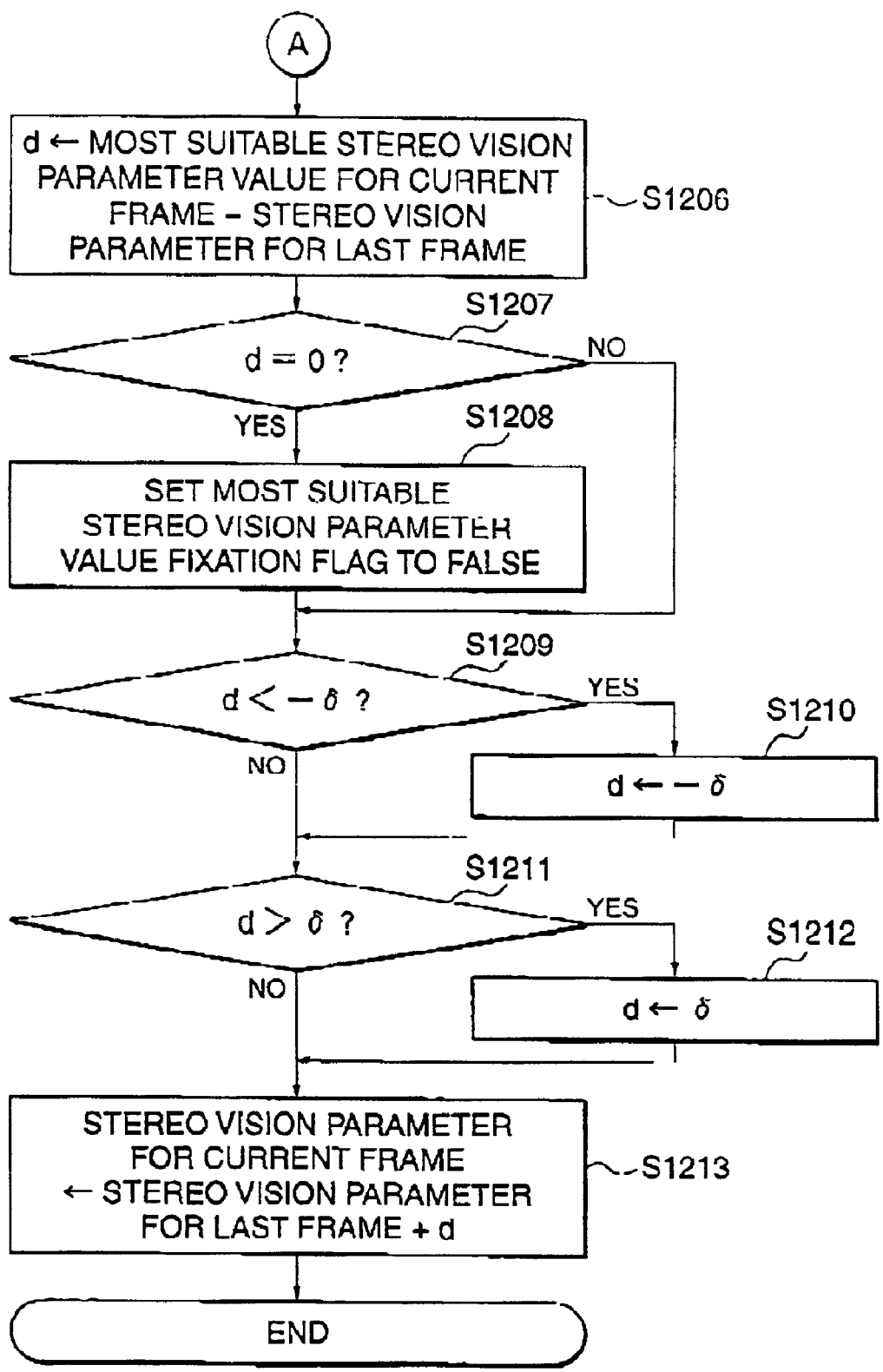
FIG. 13 is a flow chart continuing on from FIG. 12.

FIGS. 12 and 13 are flow charts showing a stereo vision parameter setting process according to the ninth embodiment.

First, in a step S1201, a determination is made as to whether or not the fixation button is pressed, and if the result of this determination is that the fixation button is pressed, then in a step S1202 a most suitable stereo vision parameter value fixation flag is set to "TRUE" and the process proceeds to a step S1203, while on the other hand if the fixation button is not pressed, then the process jumps to the step S1203.

In the step S1203, a determination is made as to whether or not the most suitable stereo vision parameter value fixation flag is set to "TRUE". If the result of this determination is that the most suitable stereo vision parameter value fixation flag is indeed set to "TRUE", then in a step S1204 the most suitable stereo vision parameter value for the current frame is set to the most suitable stereo vision parameter value for the immediately preceding frame, and then the process jumps to a step S1205.

By doing this, the most suitable stereo vision parameter value for the current frame is fixed or held at the value assumed in the timing the fixation button is pressed. On the other hand, if the result of the determination in the step S1203 is that the most suitable stereo vision parameter value fixation flag is not set to "TRUE", then in the step S1205 the most suitable stereo vision parameter value for the current frame is calculated based upon the CG data or the like, and the process proceeds to a step S1206.

In the step S1206, the stereo vision parameter for the immediately preceding frame is subtracted from the most suitable stereo vision parameter value for the current frame which has been calculated or fixed as described above, to calculate the differential value d. Next in a step S1207 a determination is made as to whether or not the differential value d is equal to zero, and if the result of this determination is that d is not equal to zero, then the process jumps to a step S1209, while on the other hand, if d=0, then it is deemed that the most suitable stereo vision parameter value for the current frame agrees with te most suitable stereo vision parameter which has been calculated or has been fixed, and in a step S1208 the most suitable stereo vision parameter value fixation flag is set to "FALSE". By doing this, the fixation of the most suitable stereo vision parameter value is canceled.

Next, in the step S1209 through a step S1213, the same process as in the steps S303 through S307 of the FIG. 3 process is executed, and then this process is terminated. Thus, after fixation release of the most suitable stereo vision parameter value, the stereo vision parameter for the current frame progressively varies in the same manner as in the case of the first embodiment described above.

According to the ninth embodiment, since the stereo vision parameter is progressively varied in the direction of the most suitable stereo vision parameter value which has been fixed, whereby the observer is able to easily perform continuous stereographic viewing. Furthermore, since after release of the fixation of the most suitable stereo vision parameter value, the stereo vision parameter for the current frame is progressively varied in the same manner as in the case of the first embodiment described above, whereby in a case such as when a body is rotating around another body in a horizontal plane within a solid body being viewed, when the stereo vision parameter is changing due to some other cause, such as the solid body being viewed being shifted itself in CG space, instantaneous change of the stereo vision parameter is prevented, so that it becomes easily possible to perform continuous stereographic viewing.

It should be noted that although in the ninth embodiment the fixation of the most suitable stereo vision parameter value by the use of the fixation button is applied by way of example to the first embodiment, this is not limitative, but the same process may be similarly applied to the second, third, fourth, or fifth embodiment as well.

In such cases, instead of the above process in the steps S1209 through S1213, the process of the steps S403 through S405 in FIG. 4 or the process of the steps S503 through S507 in FIG. 5 may be executed. Alternatively, any corresponding process in any of the processes of FIGS. 3 through 6 which are applied to the process of the step S602 in FIG. 6 or the process of the step S702 in FIG. 7 may be executed.

Tenth Embodiment

A three dimensional display control apparatus according to a tenth embodiment of the present invention has the same basic structure as that of the first embodiment (shown in FIG. 1), but is different from the same in the manner of control of the stereo vision parameter.

In a case such as when a body is rotating around another body in a horizontal plane within a solid body being viewed, and the stereo vision parameter is changing due to some other cause, such as the solid body being viewed being shifted itself in CG space, if the stereo vision parameter changes instantaneously, the observer cannot continue stereographic viewing unless he/she instantaneously copes with the change of the stereo vision parameter. This operation is accompanied by pain to the observer, and depending upon the circumstances it may happen that stereographic viewing cannot be performed for some while.

Therefore, with the tenth embodiment, the values of the most suitable stereo vision parameter assumed over a fixed time period in the past are observed, and the most suitable stereo vision parameter value is temporarily fixed based upon the result of this observation.

Figure 14:
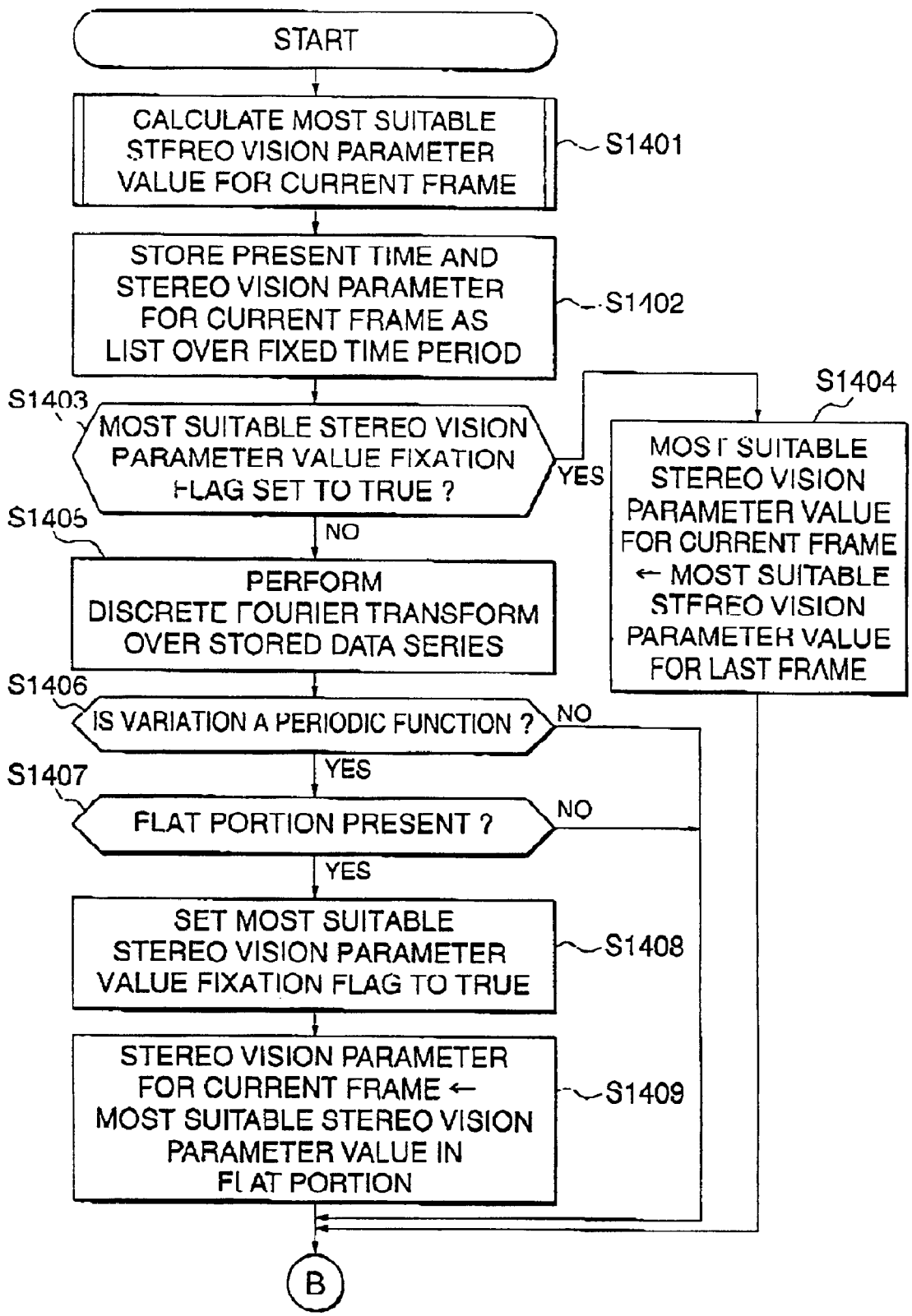
FIG. 14 is a flow chart showing a stereo vision parameter setting process according to a tenth embodiment of the present invention.
Figure 15:
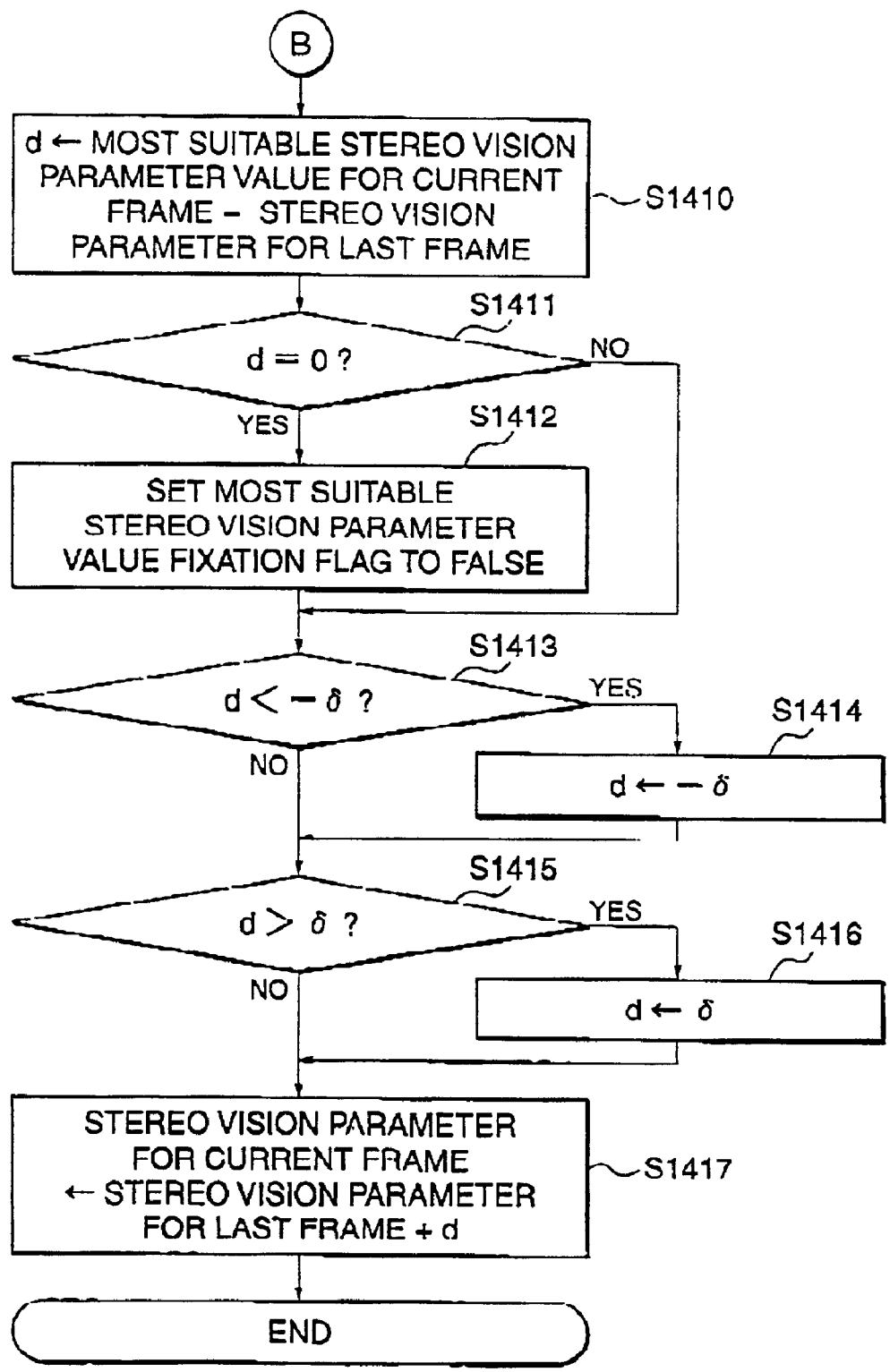
FIG. 15 is a flow chart continuing on from FIG. 14.

FIGS. 14 and 15 are flow charts showing a stereo vision parameter setting process according to the tenth embodiment.

First, in steps S1401 and S1402 the processes which are the same as the processes in the step S1001 and S1002 in FIG. 10 are executed, and next, in a step S1403, a determination is made as to whether or not the most suitable stereo vision parameter value fixation flag is set to "TRUE". If the result of this determination is that the most suitable stereo vision parameter value fixation flag is set to "TRUE", then in a stop S1404 the most suitable stereo vision parameter value for the current frame is set to the most suitable stereo vision parameter value for the immediately preceding frame, and then the process jumps to a step S1410. By doing this, the most suitable stereo vision parameter value for the current frame is fixed in timing in which the fixation flag is set to "TRUE". On the other hand, if the result of the determination in the step S1203 is that the most suitable stereo vision parameter value fixation flag is not set to "TRUE", then in steps S1405 through S1407 the processes which are the same as the processes in the steps S1003 through S1005 in FIG. 10 are executed.

If the results of the determinations in the steps S1406 and S1407 are that the variation of the most suitable stereo vision parameter value is a periodic function, and moreover this periodic function contains flat portions within its period in which the most suitable stereo vision parameter value does not vary, then in a step S1408 the most suitable stereo vision parameter value fixation flag is set to "TRUE". Next in a step S1409 the most suitable stereo vision parameter value for the current frame is set and fixed at the value of this periodic function in its flat portion in which the most suitable stereo vision parameter value does not vary in the current period or the next period, and then the process continues to the step S1410. On the other hand, if the result of the determination in the step S1406 is that the most suitable stereo vision parameter value does not vary as a periodic function, or if, although it is a periodic function, the result of the determination in the step S1407 is that within the period of this periodic function there is not present any flat portion in which the most suitable stereo vision parameter value does not vary, then the process jumps to the step S1410.

In the step S1410 through a step S1417, processes which are the same as the processes in the steps S1207 through S1213 in FIGS. 12 and 13 are executed, and then this process is terminated.

More specifically, at the time point at which the stereo vision parameter for the current frame agrees with the most suitable stereo vision parameter value for the current frame which has been calculated or fixed as described above, the fixation of the most suitable stereo vision parameter value is canceled, and moreover a limiting process is performed upon the stereo vision parameter in the same manner as in the first embodiment described above. According to the tenth embodiment, it is possible to experience the same effects as in the case of the ninth embodiment described above.

It should be noted that although in the tenth embodiment the fixation of the most suitable stereo vision parameter value is applied by way of example to the first embodiment, this is not limitative, but the same process may be similarly applied to the second, third, fourth, or fifth embodiment as well.

In such cases, instead of the above process in the steps S1413 through S1417, the process of the steps S403 through S405 in FIG. 4 or the process of the steps S503 through S507 in FIG. 5 may be executed. Alternatively, any corresponding process in any of the processes of FIGS. 3 through 6 which are applied to the process of the step S602 in FIG. 6 or the process of the step S702 in FIG. 7 may be executed.

Eleventh Embodiment

A three dimensional display control apparatus according to a eleventh embodiment of the present invention has the same basic structure as that of the first embodiment (shown in FIG. 1), and also has basically the same manner of control of the stereo vision parameter as that used in the first embodiment (shown in FIG. 3). However, the present embodiment is different from the first embodiment in that there is additionally provided a display which displays whether or not the stereo vision parameter for the current frame and the most suitable stereo vision parameter value are in agreement or not.

As in the case of the first embodiment described above, when control is performed so as to make the stereo vision parameter progressively becoming closer to the most suitable stereo vision parameter value, the observer feels frustration if he cannot tell whether or not the stereo vision parameter for the current frame is equal to the most suitable value for the current frame at the present time point. For example, when he does not know whether the stereo vision parameter for the current frame is equal to the most suitable value or not, the apparatus cannot meet his desire to move his eyes after he has checked that he is viewing in the most suitable stereo vision parameter value condition. Therefore, the present embodiment enables the observer to clearly recognize whether the stereo vision parameter for the current frame is equal to the most suitable value for the current frame.

Figure 16:
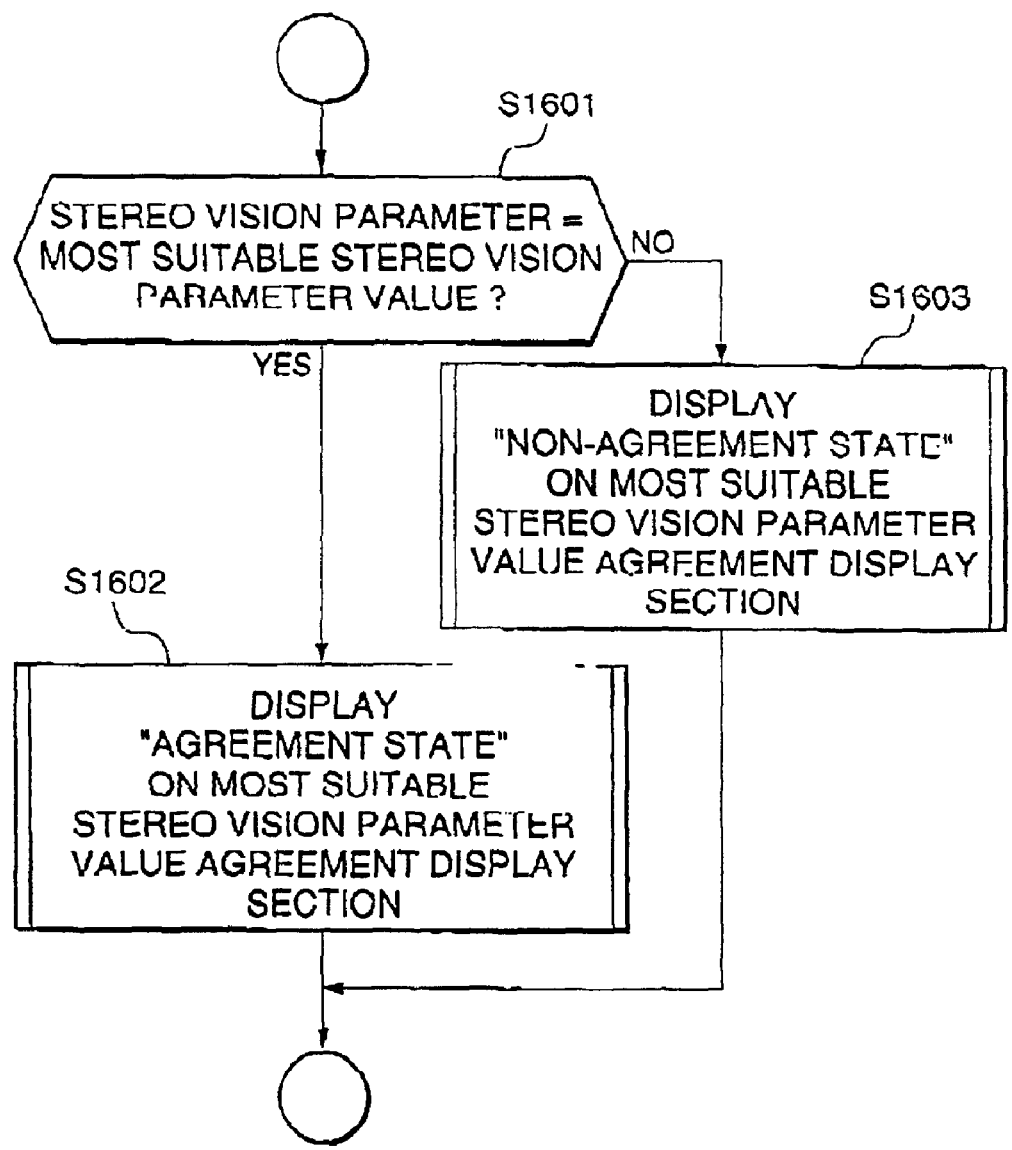
FIG. 16 is a flow chart showing a stereo vision parameter setting process according to an eleventh embodiment of the present invention.

FIG. 16 is a flow chart showing a stereo vision parameter agreement display process according to the eleventh embodiment. This process is inserted after the steps S307 in FIG. 3.

More specifically, after the step S307 in FIG. 3 is executed, the process proceeds to a step S1601 in FIG. 16, wherein a determination is made as to whether or not the stereo vision parameter for the current frame agrees with the most suitable stereo vision parameter value for the current frame.

Figure 17A:
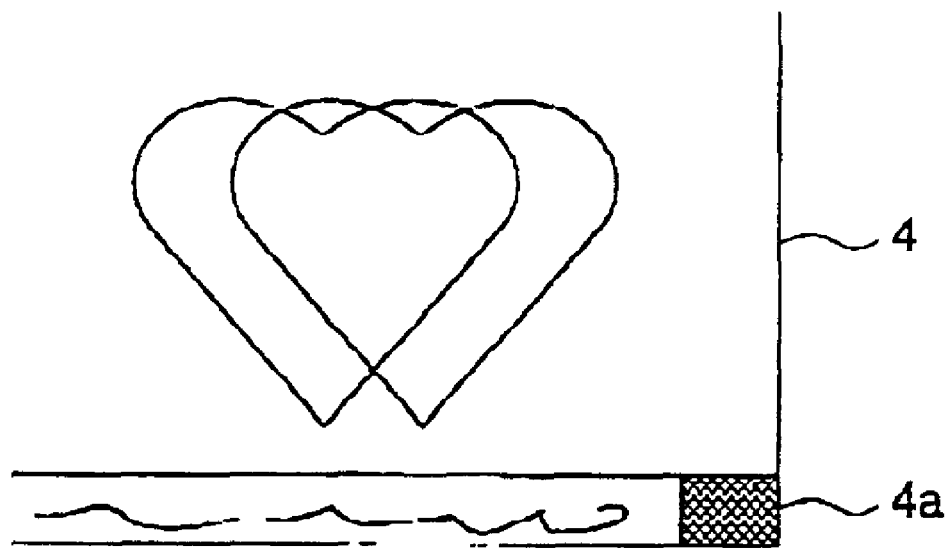
FIGS. 17A to 17C are views showing an example of display by a most suitable stereo vision parameter value display section.
Figure 17B:
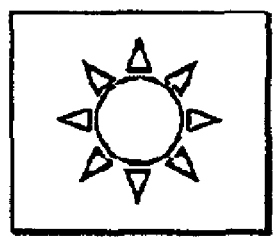
Figure 17C:

FIGS. 17A to 17C are views showing an example of display by a most suitable stereo vision parameter value display section. As shown in FIG. 17A, the most suitable stereo vision parameter value display value section 4a is, for example, provided at a lower right part of the operating section 4.

If the result of the determination in the step S1601 in FIG. 16 is that the stereo vision parameter for the current frame agrees with the most suitable stereo vision parameter value for the current frame, then in a step S1602 an indication of an agreement state as shown in FIG. 17B is displayed on the most suitable stereo vision parameter value display value section 4a, and then this process is terminated.

On the other hand, if the result of the determination in the step S1601 in FIG. 16 is that the stereo vision parameter for the current frame does not agree with the most suitable stereo vision parameter value for the current frame, then in a step S1603 all indication of a non-agreement state as shown in FIG. 17C is displayed on the most suitable stereo vision parameter value display value section 4a, and then this process is terminated.

According to the eleventh embodiment, it is possible to lower the frustration level of the observer by displaying an indication as to whether or not the stereo vision parameter currently agrees with the most suitable stereo vision parameter value.

It should be noted that, as a variation, it is possible to display an indication of an agreement state only in the case of agreement.

Moreover, it should be understood that the principle of the eleventh embodiment of providing a display for indicating agreement is not limited in its application to the process of the first embodiment, but may also be applied to any of the second through the tenth embodiments described above.

Twelfth Embodiment

A three dimensional display control apparatus according to a twelfth embodiment of the present invention has the same basic structure as that of the first embodiment (shown in FIG. 1), and also has basically the same manner of control of the stereo vision parameter as that used in the first embodiment (shown in FIG. 3). However, the twelfth embodiment is different from the first embodiment in that a most suitable stereo vision parameter value separation degree display section is provided for displaying the degree of separation between the stereo vision parameter for the current frame and the most suitable stereo vision parameter value.

As in the case of the first embodiment described above, when control is performed so as to make the stereo vision parameter progressively becoming closer to the most suitable stereo vision parameter value, the observer feels frustration if he cannot tell how far separated the stereo vision parameter for the current frame is from the most suitable stereo vision parameter value for the current frame at the present time point, because the available materials are insufficient for him to make his determination for initiating the next operation such as movement of his eyes. Therefore, the twelfth embodiment is capable of displaying the above degree of separation.

Figure 18:
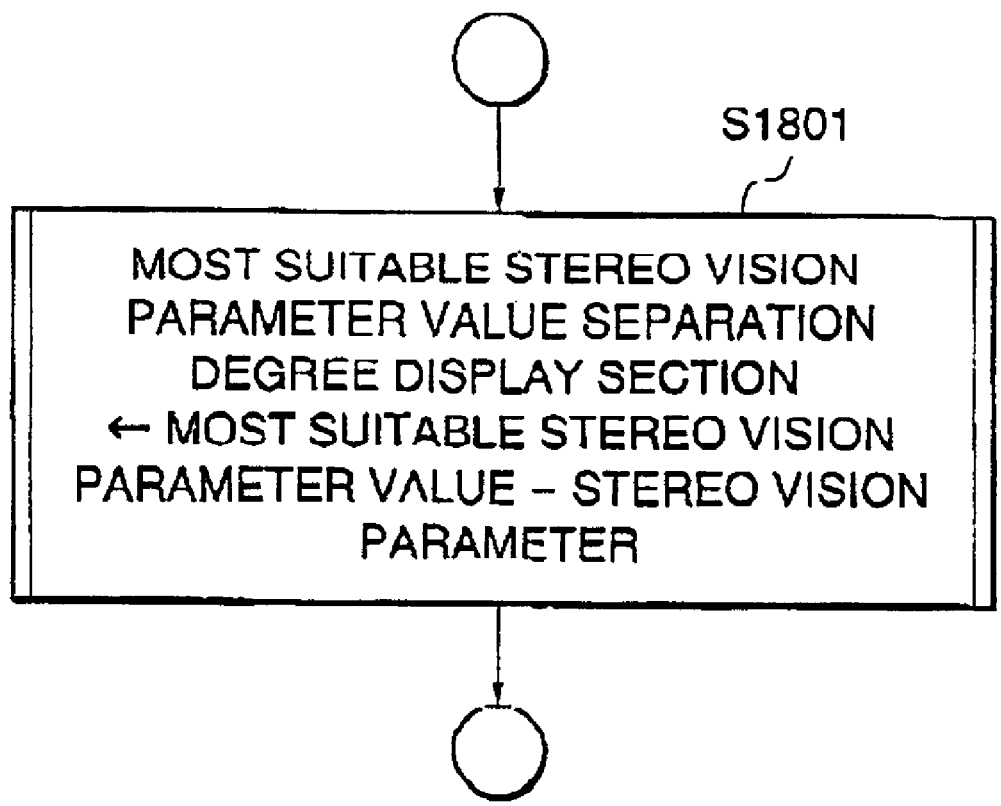
FIG. 18 is a flow chart showing a stereo vision parameter setting process according to a twelfth embodiment of the present invention.

FIG. 18 is a flow chart showing a stereo vision parameter agreement display process according to the twelfth embodiment. This process is inserted after the step S307 in FIG. 3.

Figure 19A:
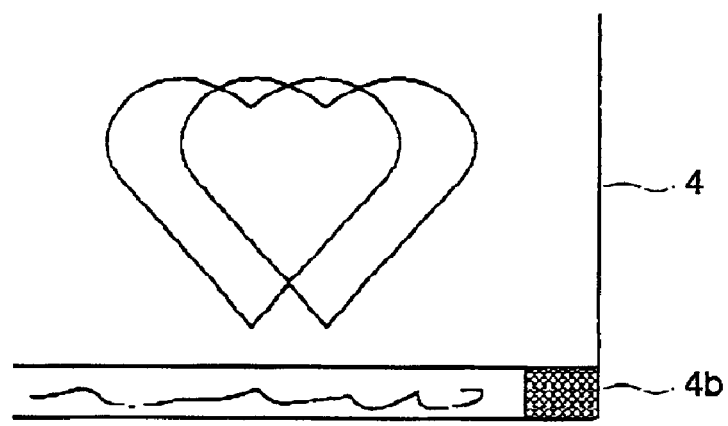
FIGS. 19A to 19D are views showing another example of display by the most suitable stereo vision parameter value display section.

FIGS. 19A to 19D are views showing an example of display by a most suitable stereo vision parameter value separation degree display section. As shown in FIG. 19A, tho most suitable stereo vision parameter value separation degree display section 4b is, for example, provided at the lower right part of the operating section 4.

Figure 19B:
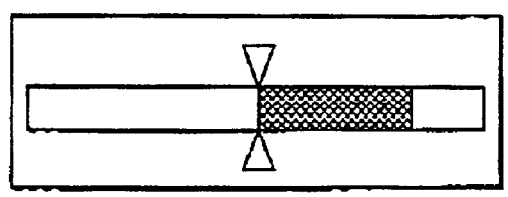
Figure 19C:
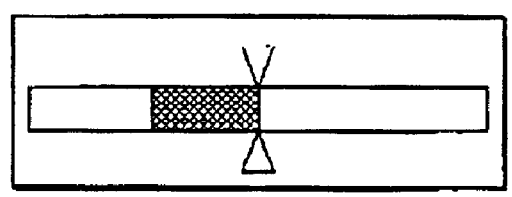
Figure 19D:
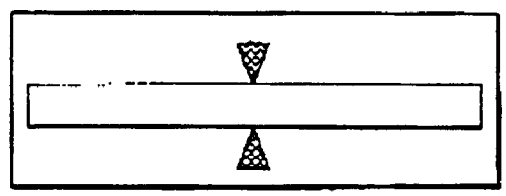

After the step S307 in FIG. 3 is executed, the process proceeds to a step S1801 in FIG. 18, wherein a value which is obtained by subtracting the stereo vision parameter for the current frame from the most suitable stereo vision parameter value for the current frame is displayed on the most suitable stereo vision parameter value separation degree display section 4b. For example, if the stereo vision parameter for the current frame does not agree with the most suitable stereo vision parameter value for the current frame, then the degree of separation is displayed along the length of a band as shown in FIGS. 19B and 19C as a surplus or a deficiency. On the other hand, if the stereo vision parameter value for the current frame actually agrees with the most suitable stereo vision parameter value for the current frame, then a display shown in FIG. 19D is provided, so as to inform the user of this agreement.

According to the twelfth embodiment, it is possible to lessen the frustration of the observer by making it easy for him to initiate the next operation such as movement of his eyes by displaying the degree of separation between the stereo vision parameter and the most suitable stereo vision parameter value.

Moreover, it should be understood that the principle of this eleventh embodiment of providing a display for indicating the degree of separation is not limited in its application to the process of the first embodiment, but may also be applied to any of the second through the eleventh embodiments described above.

It should be noted that the object of the present invention can also be attained by supplying a three dimensional display control apparatus with a storage medium that stores a program code for software which implements the functions of any of the embodiments described above, and causing a computer (or a CPU or MPU) incorporated in the three dimensional display control apparatus to read out and execute the program code stored in the storage medium.

In this case, the program code itself which has been read out from the storage medium implements the novel functions of the present invention, so that the storage medium storing this program code constitutes the present invention.

The storage medium for supplying such program code includes, for example, a floppy disk, a hard disk, an optical disk, an optical-magnetic disk, a CD-ROM, a CD-R, a magnetic tape, a non-volatile memory card, and a ROM.

Moreover, it also goes without saying that the functions of the embodiments described above may be realized not necessarily by causing the computer to read and execute the program code, but alternatively by causing an operating system (OS) running on the computer to perform part or all of the actual processing based on instructions in the program code.

Furthermore, it also goes without saying that the functions of the embodiments described above may be realized by writing the program code read from the storage medium into a memory provided on a function expansion board inserted into the computer or in a function expansion unit connected to the computer, and then causing a CPU or the like provided on the function expansion board or in the function expansion unit to perform part or all of the actual processing based on instructions in the program code.

As described above, according to the various embodiments of the present invention, the burden upon the observer is lightened by preventing abrupt change of the stereo vision parameter, whereby it is possible for him to perform continuous stereographic viewing easily.

What is claimed is:

1. A three dimensional display control apparatus that controls a stereo vision parameter for displaying a subject in stereo, comprising:

most suitable parameter value calculation means for calculating a most suitable value of the stereo vision parameter related to the subject; and shifting means operable upon execution of control of the stereo vision parameter so as to obtain a visual effect of change of a distance of a user to the subject, for progressively varying the stereo vision parameter so as to shift the stereo vision parameter to the most suitable value for the stereo vision parameter calculated by said most suitable parameter value calculation means;

wherein said shifting means temporarily sets the stereo vision parameter to a first predetermined value in an initial state of control of the stereo vision parameter and temporarily sets the stereo vision parameter to a second predetermined value if a relationship between two images before and after a change of scene is weak.

2. A three dimensional display control apparatus as claimed in claim 1, wherein said shifting means performs control of the stereo vision parameter so as to obtain a visual effect that the subject is approaching towards the user.

3. A three dimensional display control apparatus as claimed in claim 2, wherein said shifting means operable upon execution of control of the stereo vision parameter so as to obtain a visual effect that the subject is receding from the user, for changing the stereo vision parameter by progressively shifting the stereo vision parameter to the most suitable value of the stereo vision parameter.

4. A three dimensional display control apparatus as claimed in claim 3, wherein said shifting means uses different manners of progressively shifting during execution of control of the stereo vision parameter so as to obtain the visual effect that the subject is approaching towards the user and during execution of control of the stereo vision parameter so as to obtain the visual effect that the subject is receding from the user.

5. A three dimensional display control apparatus as claimed in claim 3, wherein said shifting means progressively shifts the stereo vision parameter at a rate of change with respect to time greater during execution of control of the stereo vision parameter so as to obtain the visual effect that the subject is receding from the user, than during execution of control of the stereo vision parameter so as to obtain the visual effect that the subject is approaching towards the user.

6. A three dimensional display control apparatus as claimed in claim 5, wherein said shifting means progressively shifts the stereo vision parameter by providing a limit to the rate of change with respect to time.

7. A three dimensional display control apparatus as claimed in claim 1, further comprising initial delay means for delaying commencement of control of the stereo vision parameter by said shifting means by a predetermined time period.

8. A three dimensional display control apparatus as claimed in claim 1, wherein said shifting means is operable in response to command from a user, for performing control of the stereo vision parameter so as to directly shift the stereo vision parameter to the most suitable value of the stereo vision parameter calculated by said most suitable parameter value calculation means, without performing control of the stereo vision parameter so as to progressively change the stereo vision parameter, control of the stereo vision parameter so as to temporarily set the stereo vision parameter to the first predetermined value, and control of the stereo vision parameter so as to temporarily set the stereo vision parameter to the second predetermined value.

9. A three dimensional display control apparatus as claimed in claim 1, wherein if the most suitable value of the stereo vision parameter calculated by said most suitable parameter value calculating means shows a periodic change and there is a portion in a period of the most suitable value of the stereo vision parameter in which the most suitable stereo vision parameter does not change, said shifting means performs control of the stereo vision parameter so as to directly shift the stereo vision parameter to a value of the portion in the period of the most suitable value of the stereo vision parameter, without performing control of the stereo vision parameter so as to progressively change the stereo vision parameter, control of the stereo vision parameter so as to temporarily set the stereo vision parameter to the first predetermined value, and control of the stereo vision parameter so as to temporarily set the stereo vision parameter to the second predetermined value.

10. A three dimensional display control apparatus as claimed in claim 1, further comprising most suitable parameter value fixing means for fixing the most suitable value of the stereo vision parameter calculated by said most suitable parameter value calculating means, and fixation canceling means for canceling the fixation of the most suitable value of the stereo vision parameter by said most suitable parameter value fixing means when the stereo vision parameter agrees with the most suitable value of the stereo vision parameter fixed by said most suitable parameter value fixing means.

11. A three dimensional display control apparatus as claimed in claim 10, wherein said most suitable parameter value fixing means fixes the most suitable value of the stereo vision parameter in timing designated by a user.

12. A three dimensional display control apparatus as claimed in claim 10, wherein if the most suitable value of the stereo vision parameter calculated by said most suitable parameter value calculating means shows a periodic change and there is a portion in a period of the most suitable value of the stereo vision parameter in which the most suitable stereo vision control of the stereo vision parameter does not change, said most suitable parameter value fixing means fixes the most suitable value of the stereo vision parameter to a value of the portion in the period of the calculated most suitable value of the stereo vision parameter.

13. A three dimensional display control apparatus as claimed in claim 12, further comprising agreement displaying means operable when the stereo vision parameter agrees with the most suitable value of the stereo vision parameter calculated by said most suitable parameter value calculating means, for displaying an indication of the agreement.

14. A three dimensional display control apparatus as claimed in claim 13, further comprising non-agreement display means operable when the stereo vision parameter does not agree with the most suitable value of the stereo vision parameter calculated by said most suitable parameter value calculating means, for displaying an indication of the non-agreement.

15. A three dimensional display control apparatus as claimed in claim 14, further comprising separation display means for displaying a degree by which the stereo vision parameter and the most suitable value of the stereo vision parameter calculated by said most suitable parameter value calculating means differ from one another, for a time period until the stereo vision parameter and the most suitable value of the stereo vision parameter calculated by said most suitable parameter value calculating means agree with one another.

16. A three dimensional display control method of controlling a stereo vision parameter for displaying a subject in stereo, comprising:
a most suitable parameter value calculation step of calculating a most suitable value of the stereo vision parameter related to the subject; and
a shifting step of progressively varying the stereo vision parameter so as to shift the stereo vision parameter to the most suitable value for the stereo vision parameter calculated in said most suitable parameter value calculation step, upon execution of control of the stereo vision parameter so as to obtain a visual effect of change of a distance of a user to the subject,
wherein said shrifting step comprises temporarily setting the stereo vision parameter to a first predetermined value in an initial state of control of the stereo vision parameter and temporarily setting the stereo vision parameter to a second predetermined value if a relationship between two images before and after a change of scene is weak.

17. A three dimensional display control method as claimed in claim 16, wherein said shifting step comprises performing control of the stereo vision parameter so as to obtain a visual effect that the subject is approaching towards the user.

18. A three dimensional display control method as claimed in claim 17, wherein said shifting step comprises changing the stereo vision parameter by progressively shifting the stereo vision parameter to the most suitable value of the stereo vision parameter, upon execution of control of the stereo vision parameter so as to obtain a visual effect that the subject is receding from the user.

19. A three dimensional display control method as claimed in claim 18, wherein said shifting step comprises using different manners of progressively shifting during execution of control of the stereo vision parameter so as to obtain the visual effect that the subject is approaching towards the user and during execution of control of the stereo vision parameter so as to obtain the visual effect that the subject is receding from the user.

20. A three dimensional display control method as claimed in claim 18, wherein said shifting step comprises progressively shifting the stereo vision parameter at a rate of change with respect to time greater during execution of control of the stereo vision parameter so as to obtain the visual effect that the subject is receding from the user, than during execution of control of the stereo vision parameter so as to obtain the visual effect that the subject is approaching towards the user.

21. A three dimensional display control method as claimed in claim 16, wherein said shifting step comprises progressively shifting the stereo vision parameter by providing a limit to the rate of change with respect to time.

22. A three dimensional display control method as claimed in claim 16, further comprising an initial delay step of delaying commencement of control of the stereo vision parameter by said shifting step by a predetermined time period.

23. A three dimensional display control method as claimed in claim 16, wherein said shifting step comprises performing, in response to command from a user, control of the stereo vision parameter so as to directly shift the stereo vision parameter to the most suitable value of the stereo vision parameter calculated in said most suitable parameter value calculation step, without performing control of the stereo vision parameter so as to progressively change the stereo vision parameter, control of the stereo vision parameter so as to temporarily set the stereo vision parameter to the first predetermined value, and control of the stereo vision parameter so as to temporarily set the stereo vision parameter to the second predetermined value.

24. A three dimensional display control method as claimed in claim 16, wherein if the most suitable value of the stereo vision parameter calculated in said most suitable parameter value calculating step shows a periodic change and there is a portion in a period of the most suitable value of the stereo vision parameter in which the most suitable stereo vision parameter does not change, said shifting step performs control of the stereo vision parameter so as to directly shift the stereo vision parameter to a value of the portion in the period of the most suitable value of the stereo vision parameter, without performing control of the stereo vision parameter so as to progressively change the stereo vision parameter, control of the stereo vision parameter so as to temporarily set the stereo vision parameter to the first predetermined value, and control of the stereo vision parameter so as to temporarily set the stereo vision parameter to the second predetermined value.

25. A three dimensional display control method as claimed in claim 16, further comprising a most suitable parameter value fixing step of fixing the most suitable value of the stereo vision parameter calculated in said most suitable parameter value calculating step, and a fixation canceling step of canceling the fixation of the most suitable value of the stereo vision parameter in said most suitable parameter value fixing step when the stereo vision parameter agrees with the most suitable value of the stereo vision parameter fixed in said most suitable parameter value fixing step.

26. A three dimensional display control method as claimed in claim 25, wherein said most suitable parameter value fixing step comprises fixing the most suitable value of the stereo vision parameter in timing designated by a user.

27. A three dimensional display control method as claimed in claim 26, wherein if the most suitable value of the stereo vision parameter calculated in said most suitable parameter value calculating step shows a periodic change and there is a portion in a period of the most suitable value of the stereo vision parameter in which the most suitable stereo vision control of the stereo vision parameter does not change, said most suitable parameter value fixing step fixes the most suitable value of the stereo vision parameter to a value of the portion in the period of the calculated most suitable value of the stereo vision parameter.

28. A three dimensional display control method as claimed in claim 27, further comprising an agreement displaying step of displaying an indication of an agreement of the stereo vision parameter agrees with the most suitable value of the stereo vision parameter calculated in said most suitable parameter value calculating step when the stereo vision parameter agrees with the most suitable value of the stereo vision parameter calculated in said most suitable parameter value calculating step.

29. A three dimensional display control method as claimed in claim 28, further comprising a non-agreement displaying step of displaying an indication of a non-agreement of the stereo vision parameter does not agree with the most suitable value of the stereo vision parameter calculated in said most suitable parameter value calculating step when the stereo vision parameter does not agree with the most suitable value of the stereo vision parameter calculated in said most suitable parameter value calculating step.

30. A three dimensional display control method as claimed in claim 29, further comprising a separation displaying step of displaying a degree by which the stereo vision parameter and the most suitable value of the stereo vision parameter calculated in said most suitable parameter value calculating step differ from one another, for a time period until the stereo vision parameter and the most suitable value of the stereo vision parameter calculated in said most suitable parameter value calculating step agree with one another.

31. A storage medium storing a program for use in a three dimensional display control method of controlling a stereo vision parameter for displaying a subject in stereo, said program comprising a program code for executing:

a most suitable parameter value calculation step of calculating a most suitable value of the stereo vision parameter related to the subject; and a shifting step of progressively varying the stereo vision parameter so as to shift the stereo vision parameter to the most suitable value for the stereo vision parameter calculated in said most suitable parameter value calculation step, upon execution of control of the stereo vision parameter so as to obtain a visual effect of change of a distance of a user to the subject, wherein said shifting step comprises temporarily setting the stereo vision parameter to a first predetermined value in an initial state of control of the stereo vision parameter and temporarily setting the stereo vision parameter to a second predetermined value if a relationship between two images before and after a change of scene is weak.

* * * * *